(12) United States Patent
Boyer

(10) Patent No.: US 12,487,614 B2
(45) Date of Patent: Dec. 2, 2025

(54) HYBRID FLOW AND PRESSURE REGULATION

(71) Applicant: The ESAB Group Inc., North Bethesda, MD (US)

(72) Inventor: Robert Boyer, Flower Mound, TX (US)

(73) Assignee: THE ESAB GROUP INC., Florence, SC (US)

( * ) Notice: Subject to any disclaimer, the term of this patent is extended or adjusted under 35 U.S.C. 154(b) by 457 days.

(21) Appl. No.: 17/983,106

(22) Filed: Nov. 8, 2022

(65) Prior Publication Data

US 2023/0063065 A1 Mar. 2, 2023

Related U.S. Application Data

(63) Continuation of application No. PCT/US2021/032856, filed on May 18, 2021.
(Continued)

(51) Int. Cl.
G05D 16/00 (2006.01)
F17C 13/04 (2006.01)
G05D 16/10 (2006.01)

(52) U.S. Cl.
CPC .......... *G05D 16/024* (2019.01); *F17C 13/04* (2013.01); *G05D 16/103* (2013.01);
(Continued)

(58) Field of Classification Search
CPC .... G05D 16/024; G05D 16/103; F17C 13/04; F17C 2201/0109; F17C 2205/0323; F17C 2250/43; F17C 2250/0626
See application file for complete search history.

(56) References Cited

U.S. PATENT DOCUMENTS 1,856,505 A 5/1932 Persson
2,318,962 A * 5/1943 Parker .................. F16K 15/026
137/513.3
(Continued)

FOREIGN PATENT DOCUMENTS

CN 105927524 A 9/2016
CN 106557751 A 4/2017
(Continued)

OTHER PUBLICATIONS

Esab Victor, ESS3-Edge Series Flow Gauge, Gas Equipment, Produts & Solutions, available at http://www.esabna.com/us/en/products/index.cfm?fuseaction=home.product&productCode=V445180, last accessed on Sep. 12, 2017, 3 pages.
(Continued)

*Primary Examiner* — Jessica Cahill
(74) *Attorney, Agent, or Firm* — Edell, Shapiro & Finnan, LLC

(57) ABSTRACT

An outlet assembly for hybrid pressure and flow regulation includes a first orifice of a first size, a second orifice of a second size that is larger than the first size, and a mechanism that automatically moves the first orifice between a first position, a second position, and a third position. When the first orifice is in the first position, the flow of gas passes through the first orifice, which regulates a flow rate of the flow of gas through the second orifice. When the first orifice is in the second position, the flow of gas primarily bypasses the first orifice and flows through the second orifice with a first specific flow rate. When the first orifice is in the third position, the flow of gas primarily bypasses the first orifice and flows through the second orifice with a second specific flow rate.

20 Claims, 15 Drawing Sheets

Related U.S. Application Data

(60) Provisional application No. 63/026,253, filed on May 18, 2020.

(52) U.S. Cl.
CPC .............. F17C 2201/0109 (2013.01); F17C 2205/0323 (2013.01); F17C 2250/043 (2013.01); F17C 2250/0626 (2013.01)

(56) References Cited

U.S. PATENT DOCUMENTS

| | | | |
|---|---|---|---|
| 3,060,745 A | 10/1962 | Riley | |
| 3,547,143 A | 12/1970 | Mills | |
| 3,586,045 A | 6/1971 | Zimmer | |
| D225,268 S | 11/1972 | Waite | |
| D242,235 S | 11/1976 | Redmann | |
| 4,000,684 A * | 1/1977 | Ruffley | F15B 11/068 |
| | | | 137/613 |
| 4,044,791 A * | 8/1977 | McKenzie | F16K 17/18 |
| | | | 137/513.3 |
| 4,080,988 A * | 3/1978 | Robertson | F16K 15/026 |
| | | | 137/513.3 |
| 4,174,733 A | 11/1979 | Eidsmore | |
| 4,428,396 A * | 1/1984 | Wall | F16K 47/10 |
| | | | 137/493 |
| 4,773,270 A | 9/1988 | Ogasawara et al. | |
| D302,394 S | 7/1989 | Merrell | |
| 4,891,987 A | 1/1990 | Stockton et al. | |
| 5,085,246 A * | 2/1992 | Griinke | F16K 17/30 |
| | | | 137/504 |
| 5,323,773 A | 6/1994 | Kobayashi | |
| 5,373,873 A | 12/1994 | Miller | |
| 5,398,721 A | 3/1995 | Pryor | |
| D361,043 S | 8/1995 | Grilk | |
| 5,529,096 A | 6/1996 | Rowe, Jr. et al. | |
| 6,158,457 A | 12/2000 | Byrd | |
| 6,273,686 B1 | 8/2001 | Kroell | |
| 6,334,469 B1 * | 1/2002 | Taniguchi | F17C 13/04 |
| | | | 141/383 |
| 6,484,750 B1 | 11/2002 | Foos | |
| 6,647,982 B1 | 11/2003 | Zaiser | |
| 6,834,672 B2 | 12/2004 | Chen | |
| 6,920,895 B2 * | 7/2005 | Avis | F16K 17/30 |
| | | | 137/462 |
| 7,089,956 B1 | 8/2006 | Davidson | |
| 7,140,386 B2 | 11/2006 | Avis et al. | |
| D537,744 S | 3/2007 | Wu | |
| 7,566,044 B1 * | 7/2009 | Bowser | F16L 37/42 |
| | | | 251/117 |
| 7,762,276 B2 | 7/2010 | Miller | |
| 8,622,058 B2 | 1/2014 | Hacke | |
| D706,661 S | 6/2014 | Boyer | |
| 9,557,747 B2 | 1/2017 | Brown | |
| 10,437,268 B2 | 10/2019 | Boyer et al. | |
| 10,918,501 B2 * | 2/2021 | Shen | A61F 2/68 |
| 11,079,776 B2 | 8/2021 | Boyer et al. | |
| 2004/0099317 A1 | 5/2004 | Douglas | |
| 2006/0060251 A1 * | 3/2006 | Gamard | F16K 17/30 |
| | | | 137/613 |
| 2008/0083463 A1 | 4/2008 | Fazekas | |
| 2008/0185549 A1 * | 8/2008 | Steinbuchel | G05D 16/103 |
| | | | 251/205 |
| 2009/0050218 A1 | 2/2009 | Burgess | |
| 2010/0229959 A1 | 9/2010 | Boyer | |
| 2016/0131121 A1 | 5/2016 | Steingass | |
| 2017/0114924 A1 | 4/2017 | Tatarek | |
| 2019/0064856 A1 * | 2/2019 | Boyer | F16K 37/0016 |

FOREIGN PATENT DOCUMENTS

| | | |
|---|---|---|
| CN | 206291996 U | 6/2017 |
| CN | 109424784 A | 3/2019 |
| EP | 2835710 A1 | 2/2015 |
| JP | H0735251 A | 2/1995 |

OTHER PUBLICATIONS

Victor, Edge Series 2.0 Regulators High Capacity, Single Stage Regulator Fact Sheet, May, 4, 2017, 2 pages.
Western Enterprises, "VN Series Game Changer Presentation," available at http://westernenterprises.com/wp-content/uploads/2013/09/VN-Game-Changer-Presentation.pdf, downloaded on May 11, 2017, 18 pages.
Communication from European Patent Office for EP Patent Application No. 18184406.9-1204, Partial European Search Report, dated Jan. 28, 2019, 16 pages.
Chinese Office Action in corresponding Chinese Application No. 201810950806.5, mailed Jul. 24, 2019, 18 pages with English translation.
International Search Report and Written Opinion for PCT App. No. PCT/US2021/032856, mailed Sep. 17, 2021, 14 pages.
Extended European Search Report for European Application No. 19216218.8 dated Mar. 23, 2020, 10 pages.
Examination Report No. 1 for Australian Patent Application No. 2018220035 dated May 20, 2019, 5 pages.
Notification of Second Office Action for Chinese Patent Application No. 201810950806.5 dated Apr. 29, 2020, 3 pages.
Examination Report No. 1 for Australian Patent Application No. 2021275009 from the Australian Government, IP Australia, dated Jun. 19, 2023, 4 pages.
Office Action issued by the Canadian Intellectual Property Office for Canadian Patent Application No. 3,178,551, dated May 8, 2024, 4 pages.
First Office Action from The State Intellectual Property Office of People's Republic of China for Chinese Patent Application No. 2021800.3222.7 with English translation dated Apr. 25, 2025 , 38 pages.

* cited by examiner

HYBRID FLOW AND PRESSURE REGULATION

CROSS REFERENCE TO RELATED APPLICATIONS

This application is a continuation of International (PCT) Patent Application No. PCT/US2021/032856, filed May 18, 2021, and entitled "Hybrid Flow and Pressure Regulation," which claims priority to and is based on U.S. Patent Application No. 63/026,253, filed May 18, 2020, and entitled "Hybrid Flow and Pressure Regulation." The entire disclosure of each of these applications is incorporated herein by reference.

TECHNICAL FIELD

The present disclosure is directed toward gas regulation and, in particular, toward regulation of gas based on pressure and/or flow with a single apparatus.

BACKGROUND

There are two common types of gas pressure regulators: pressure regulators and flowgauge regulators. Pressure regulators control the pressure of a gas passing therethrough and regulate an inlet pressure to a specific outlet pressure. Often, pressure regulators include two gauges: an inlet pressure gauge and an outlet (or "delivery") pressure gauge. These gauges have scales and increments, and may indicate pressure in pounds per square inch (PSI), bar, kilopascal (kPa), or other pressure units. By comparison, flowgauge regulators output a specific flow rate. That is, a flowgauge regulator outputs a specific flow rate when a specific pressure is generated inside the regulator. The gauge on a flowgauge regulator provides an indication of the flow rate (e.g., in cubic feet per hour (CFH)). Typically, in operation, an operator must utilize separate regulators to control and/or measure pressure and then control and/or measure a flow rate.

U.S. Pat. No. 10,437,268 is drawn to hybrid pressure-flow regulation and achieves this hybrid regulation with a multi-stage outlet assembly. However, the multi-stage outlet assembly sometimes experiences flow restrictions during pressure testing. Thus, improved hybrid pressure-flow regulation techniques are desired.

SUMMARY

The present disclosure is directed towards hybrid pressure and flow regulation. According to one embodiment, hybrid pressure and flow regulation is effectuated with an outlet assembly that directs a pressure-regulated flow of gas into a downstream gas line at a particular flow rate.

According to one embodiment, an outlet assembly for hybrid pressure and flow regulation includes a housing, a first orifice, a second orifice, one or more first auxiliary pathways, one or more second auxiliary pathways, and an internal mechanism. The housing defines an internal cavity and is secured or securable to a gas cylinder, gas cylinder fitting, or a regulator body of a hybrid pressure and flowgauge regulator. The first orifice is a first size and is disposed proximate an upstream end of a main pathway that extends longitudinally through the internal cavity. The second orifice is a second size that is larger than the first size and is disposed proximate a downstream end of the main pathway. The one or more first auxiliary pathways and the one or more second auxiliary pathways that are each disposed between the first orifice and the second orifice and each intersect the main pathway. The internal mechanism automatically moves the first orifice between a first position, a second position, and a third position.

When the first orifice is in the first position, a flow of gas flowing through the outlet assembly flows into the main pathway via the first orifice so that the flow of gas flows through the second orifice at a first flow rate regulated by the first orifice. When the first orifice is in the second position, the flow of gas primarily bypasses the first orifice and primarily flows into the main pathway via the one or more first auxiliary pathways so that the flow of gas flows through the second orifice at a second flow rate regulated by the first orifice and the one or more first auxiliary pathways. When the first orifice is in the third position, the flow of gas primarily bypasses the first orifice and primarily flows into the main pathway via the one or more first auxiliary pathways and the one or more second auxiliary pathways so that the flow of gas flows through the second orifice at a maximum flow rate. Among other advantages, the three positions may allow for precise flow and pressure regulation that is suitable for brazing, purging, and pressure testing. For example, the third position may ensure that pressure testing can be conducted without undesirable flow restrictions.

In at least some embodiments, the outlet assembly can be included on an apparatus that also includes a gauge that provides a visual indication of a flow rate and/or pressure of a flow of gas exiting the outlet assembly. Advantageously, the visual indicia may allow a user to precisely regulate gas to a specific pressure or flow rate. The gauge may include radial indicia with a first portion and a second portion. The first portion provides an indication of the specific flow rate and the second portion provides an indication of the second pressure. Moreover, the first portion may define flow ranges suitable for at least one of brazing and purging. The various portions and/or defined flow ranges may be advantageous because they may offer clear visual indications that gas is suitable for frequently executed pressure or flow specific operations.

Additionally or alternatively, the internal mechanism of the apparatus may include a movable poppet that moves the first orifice between the first position, the second position, and the third position. For example, in some instances, the housing defines the second orifice and the movable poppet defines the first orifice and the main pathway. Regardless, a movable poppet is a relatively inexpensive, effective, and stable mechanism for moving the first orifice.

In some of these embodiments, the mechanism also includes a first biasing member, a bypass poppet, and a second biasing member. The first biasing member is biased against the movable poppet to cause the movable poppet to retain the first orifice in the first position until backpressure in the outlet assembly reaches a first predetermined threshold. The bypass poppet is disposed around the movable poppet so that the movable poppet acts on the bypass poppet when the first orifice is in or moving to the second position (or in or moving to the third position). The second biasing member is biased against the bypass poppet and acts on the bypass poppet to cause the movable poppet to retain the first orifice in the second position until the backpressure in the outlet assembly reaches a second predetermined threshold. Advantageously, the biasing members may ensure that the first orifice automatically returns to a position that is suitable for providing low flow rates when necessary (e.g., when pressure drops). Moreover, the bypass poppet may selectively increase the flow area available in the outlet assembly, allowing for increased flow during high-pressure operations (e.g., during pressure testing).

As is also described in further detail below, in at least some embodiments with biasing members, backpressure automatically moves the movable poppet so that the movable poppet moves the first orifice into the second position when the backpressure reaches the first predetermined threshold and so that the movable poppet moves the first orifice into the third position when the backpressure reaches the second predetermined threshold. Consequently, and advantageously, a user need not interact with the orifices to achieve different flow rates.

Still further, in some embodiments, the outlet assembly also includes a first annular passageway and a second annular passageway. The first annular passageway is opened when the movable poppet moves the first orifice into the second position to allow the flow of gas to primarily bypass the first orifice. When open, the first annular passageway providing a flow path to the one or more first auxiliary pathways. The second annular passageway is opened when the movable poppet moves the bypass poppet (e.g., while moving the first orifice to its third position). When open, the second annular passageway providing a flow path to the one or more second auxiliary pathways. As mentioned, a movable poppet and/or automatic movement may provide a number of advantages, such as efficient and easy gas regulation. Moreover, opening the second annular passageway may substantially increase the flow rate of the flow of gas for pressure testing, so that pressure testing can be completed quickly and efficiently.

Additionally or alternatively, the outlet assembly may include a first annular flange and a second annular flange. The first annular flange may be disposed radially exteriorly of the first orifice, proximate the upstream end of the main pathway and may be configured to seal peripheral edges of a first backpressure chamber formed around the first orifice when the first orifice is in the first position. However, the first annular flange may open the peripheral edges of the first backpressure chamber when the first orifice is in the second position. The second annular flange may be disposed radially exteriorly of the first annular flange, proximate the upstream end of the main pathway and may be configured to seal peripheral edges of a second backpressure chamber formed around the first orifice when the first orifice is in the second position. Then, the second annular flange may open the peripheral edges of the second backpressure chamber when the first orifice is in the third position. This allows different flow rates to be achieved at different pressure thresholds, which may be advantageous when the outlet assembly is used to regulate gas for different functions (e.g., brazing, purging, and pressure testing).

In some instances, the outlet assembly may be removably or fixedly secured to a cylinder fitting (which may be removably or fixedly coupled to a gas cylinder). Thus, an end user can deliver a cylinder to a work site without needing to remember to bring or acquire one or more regulators for brazing, purging, and/or pressure testing. Fixedly securing (e.g., irremovably securing) the outlet assembly to a cylinder fitting that is fixedly secured (e.g., irremovably secured) to a gas cylinder may also ensure that the outlet assembly is not detached, intentionally or unintentionally, over the life of the gas cylinder, which may ensure that the gas cylinder is continuously operational over its life (provided appropriate maintenance is performed). Alternatively, the outlet assembly may be removably securable to a regulator body of the hybrid pressure and flowgauge regulator. For example, the outlet assembly can be retrofitted to stand-alone regulator devices to convert the stand-alone regulators into hybrid regulators or switched between regulator bodies as regulator bodies are serviced, upgraded, etc. This may also allow the outlet assembly to be used with different styles, shapes, or configurations of regulator bodies (i.e., regulator bodies sized for specific applications).

In at least some instances, a cylindrical fitting and/or a regulator including the outlet assembly may include a single gauge including first indicia and second indicia. The first indicia provide an indication of a flow rate of gas exiting an outlet of a hybrid pressure and flowgauge regulator when the gas exits with a pressure below a gauge threshold pressure. The second indicia provide an indication of a pressure of the gas exiting the outlet of the hybrid pressure and flowgauge regulator when the gas exits with a pressure above the gauge threshold pressure. Consequently, a user can easily and accurately monitor gas regulation to safely and accurately achieve a variety of pressures or flow rates.

In some embodiments, the first indicia and the second indicia of the single gauge are visual indicia. Additionally or alternatively, the first indicia may define flow ranges for at least one of brazing and purging. Still further, in some embodiments of the single gauge, the first indicia and the second indicia are included in distinct portions of a radial band. In yet other embodiments, the second indicia include radial indicia configured to indicate the pressure of the gas exiting the outlet. As mentioned, among other advantages the various indicia, portions, and flow ranges may be advantageous because they may offer clear visual indications that gas is suitable for frequently executed pressure or flow specific operations.

According to another embodiment, the present application is directed to a gas cylinder including a cylinder with a tank and an outlet and a hybrid pressure and flow fitting irremovably coupled to the outlet of the cylinder. The hybrid pressure and flow fitting includes an outlet assembly with a housing defining an internal cavity extending from an upstream end to a downstream end, a plug disposed within the internal cavity proximate the upstream end, and a two-stage poppet disposed within the internal cavity between the plug and the downstream end of the internal cavity.

The two-stage poppet includes a first seat defining a central orifice, a second seat disposed around the first seat, a first biasing member, and a second biasing member. The first biasing member is biased against the first seat to cause the first seat to engage the plug until backpressure acting against the first seat reaches a first predetermined threshold. The second biasing member that is biased against the second seat to cause the second seat to engage the plug until backpressure acting against the second seat reaches a second predetermined threshold. Disengaging the first seat from the plug opens a first flow path between the first seat and the second seat, the first flow path allowing gas to flow at a first flow rate that is greater than a flow rate allowed by the central orifice. Similarly, disengaging the second seat from the plug opens a second flow path between the second seat and the housing, the second flow path allowing a gas to flow at a second flow rate that is greater than the flow rate allowed by the central orifice.

In some instances, the backpressure acting against the second seat primarily acts against the second seat indirectly, by way of the first seat. Additionally or alternatively, the second seat can disengage from the plug after the first seat disengages from the plug so that the second flow path is open when the first flow path is also open. In some of these embodiments, the second flow path and the first flow path collectively allow gas to flow at a third flow rate that is greater than both the first flow rate and the flow rate allowed by the central orifice.

Moreover, in some instances, the hybrid pressure and flow fitting further includes a pressure control, an on/off control, and a gauge and the pressure control may be aligned on a longitudinal axis of the tank of the gas cylinder while the an on/off control and the gauge are oriented orthogonally to the longitudinal axis of the tank.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following FIGS..

Like numerals identify like components throughout the Figures.

DETAILED DESCRIPTION

Figure 1:
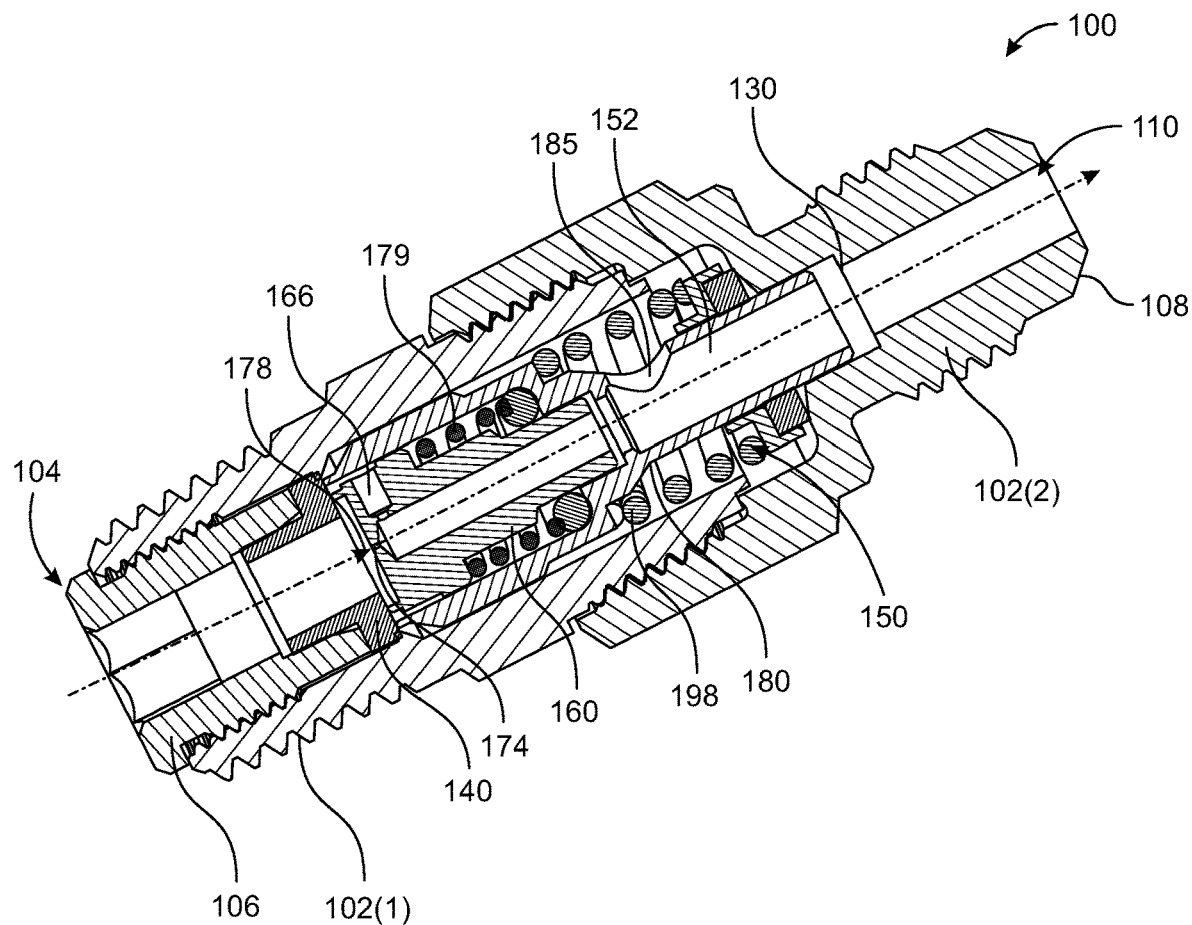
FIG. 1 is a sectional view of an outlet assembly for a hybrid pressure and flowgauge regulator, according to an example embodiment of the present disclosure.

The following description is not to be taken in a limiting sense but is given solely for the purpose of describing the broad principles of the invention. Embodiments of the invention will be described by way of example, with reference to the above-mentioned drawings showing elements and results according to the present invention.

Generally, hybrid pressure and flowgauge regulation techniques are described and presented herein. The techniques are achieved with at least a stand-alone regulator and a fitting, but for the purposes of this application, the term "regulator" may cover both stand-alone regulators and cylinder fittings that provide regulation. Thus, the terms "stand-alone regulator" and "fitting," or the like, may refer to types or classes of regulators and the term "regulator" may refer to both of these types of regulators, as well as other types of regulators. That said, the regulators presented herein are hybrid because they can be used to measure and/or control the flow rate and/or pressure of a gas passing therethrough and do not need to be swapped or supplemented with another regulator in order to provide this dual functionality. That is, the regulator described and presented herein is a single device that can regulate pressure and flow rate. To accomplish this, the regulator presented herein includes a unique outlet assembly that automatically alters a flow path of a gas exiting the regulator based on a pressure of the gas. More specifically, the outlet assembly has multiple flow paths that can be selectively opened to provide different flow rates for certain ranges of low pressures and to provide high flow rates for higher pressures, for example, to allow for precise and efficient pressure testing.

By comparison, many existing regulators often measure and/or control pressure or flow, but not both. Consequently, if a user needs to measure flow in a first operation and pressure in a second operation, the user may need to carry two regulators and swap out the regulators between operations. As a more specific example, if a plumber needs to braze a connection and subsequently pressure test the system including the brazed connection, the plumber may need to swap a flowgauge regulator out for a pressure regulator between the brazing and the pressure testing steps. This may be burdensome and expensive (insofar as the user needs to purchase and carry two regulators) and is also inefficient. In view of this, U.S. Pat. No. 10,437,268, which is owned by the present Applicant, introduced for a hybrid regulator. However, this hybrid regulator may provide limited flow at high pressures (since the same flow path is utilized for purging and pressure testing) and, thus, may be inefficient for pressure testing.

Alternatively, some regulators may include different orifices that can be manually switched into operation to support different operations; however, these regulators typically operate off a fixed pressure, which may cause certain flow rates to be delivered with a dangerous amount of pressure. For example, if a system including one of these regulators is "dead-ended," the high pressure in the regulator may build up and result in a catastrophic failure. Dead-ending occurs when the nozzle or outlet of a hose, tube, or other aperture is blocked. The fixed pressure rate of existing regulators also limits the flexibility and/or viability of the regulator for pressure operations that require pressures differing from the predefined pressure (and heating, ventilation, and air conditioning (HVAC) operations frequently require pressures anywhere in the range of 200 PSI to 750 PSI). Consequently, an operator with a multiple-orifice regulator may still be required to carry multiple regulators (i.e., for different pressures) and swap out regulators between operations. Moreover, often, these multi-orifice devices do not provide feedback relating to the pressure and/or flow rate and a user must trust operational settings marked on the device (i.e., "braze" or "purge" markings without any specific flow or pressure indications).

FIG. 1 illustrates a sectional view of an outlet assembly 100 for hybrid pressure and flow regulation. The outlet assembly 100 includes a housing 102 that extends from a first end 104 to a second end 108. The first end 104 (i.e., upstream end) defines or includes an inlet 106 while the second end 108 (i.e., downstream end) terminates in an outlet 110. In the depicted embodiment, the outlet 110 is the same size as a second orifice 130 defined proximate the downstream end 108 of the housing 102. To regulate pressure and flow of gas flowing therethrough (illustrated as flow F1 in FIG. 1), the outlet assembly 100 includes an internal mechanism 150 that defines a first orifice 174 and auxiliary pathways that are disposed between the first orifice 174 and the second stage orifice 130, including: one or more first auxiliary pathways 166; and one or more second auxiliary pathways 185.

The first orifice 174 is connected to the second orifice 130 by a main pathway 152 into which the one or more first auxiliary pathways 166 and the one or more second auxiliary pathways 185 extend. That is, the outlet assembly 100 includes a main pathway 152 that extends lengthwise (i.e., along a direction extending between the first end 104 and the second end 108 of the outlet assembly 100) and serves as a conduit between the first orifice 174 and the second orifice 130 (or at least a conduit between the first orifice 174 and a conduit that connects the main pathway 152 to the second orifice 130). Meanwhile, the one or more first auxiliary pathways 166 and the one or more second auxiliary pathways 185 extend perpendicularly to the main pathway 152 and intersect the main pathway 152 to connect annular passageways 176 and 196 (see FIGS. 4, 6B, and 6C) to the main pathway 152.

As is explained in further detail below, the internal mechanism 150 automatically moves the first orifice 174 between a first position P1, a second position P2, and a third position P3 to selectively open annular passageways 176 and 196 (see FIGS. 6A-6C). For example, in some instances, the internal mechanism 150 is a two-stage, two-part poppet. More specifically, the internal mechanism 150 may include a first portion 160 (also referred to herein as a movable poppet 160), a first biasing member 179, a second portion 180 (also referred to herein as a bypass poppet 180), and a second biasing member 198. The first biasing member 179 may be configured to allow the movable poppet 160 to translate in a downstream direction in response to backpressure, thereby moving the internal mechanism 150 from its first position P1 to its second position P2. Meanwhile, the second biasing member 198 may be configured to allow the bypass poppet 180 to translate in a downstream direction in response to backpressure, thereby moving the internal mechanism 150 from its second position P2 to its third position P3. In FIG. 1, backpressure is generated in a backpressure chamber 178 defined between the internal mechanism 150 and a plug 140 included proximate the first end 104 of the outlet assembly 100.

Figure 2:
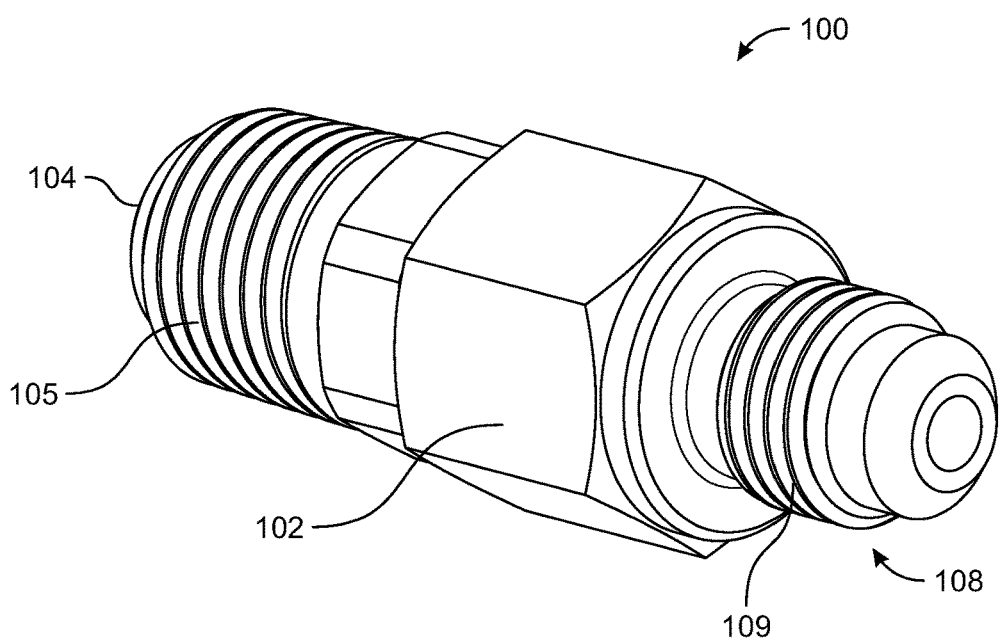
FIG. 2 is an external perspective view of the outlet assembly of FIG. 1
Figure 3A:
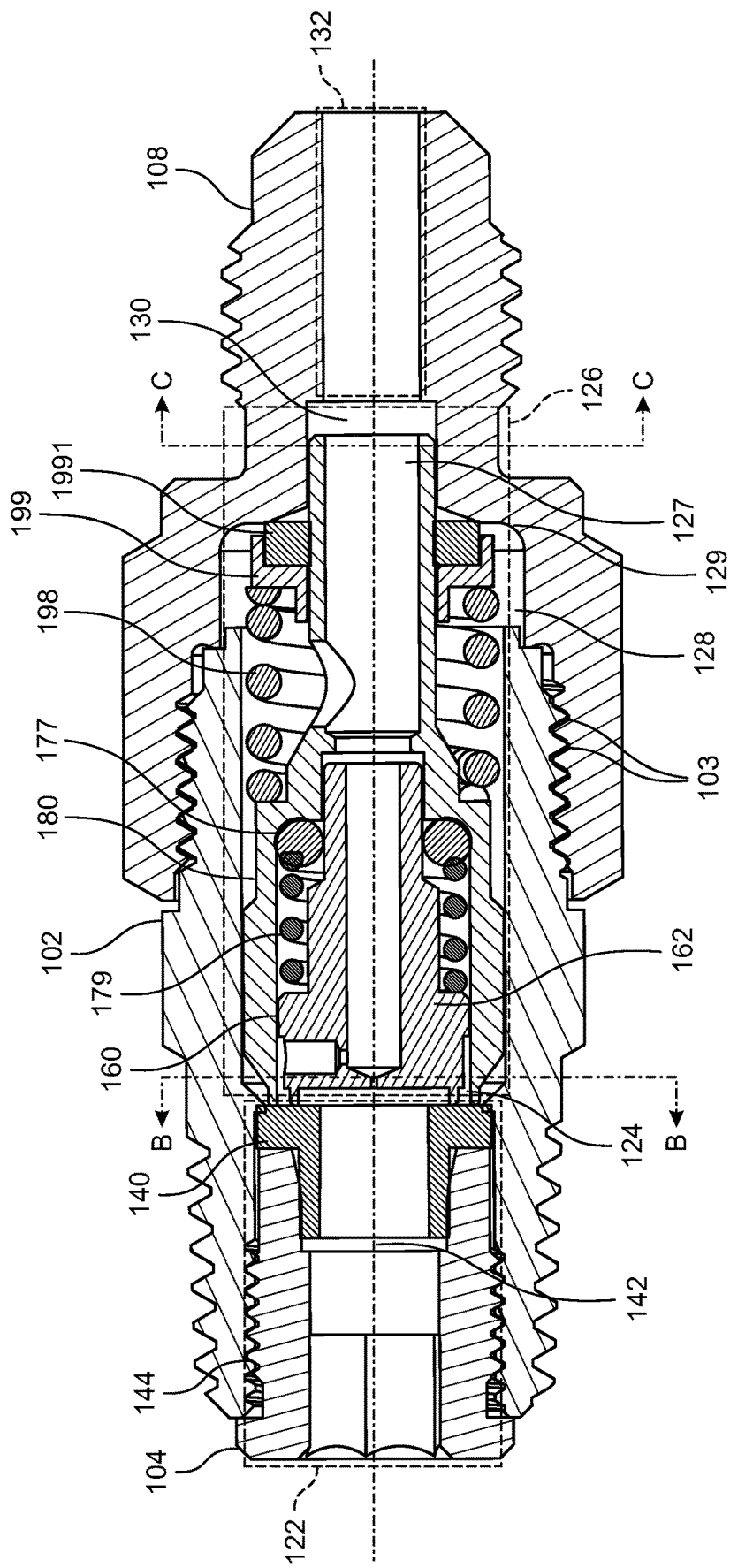
FIG. 3A is a side sectional view of outlet assembly of FIG. 1.

Still referring to FIG. 1, but now in combination with FIG. 2, in the depicted embodiment, the housing 102 is a two-part housing formed from a first portion 102(1) and a second portion 102(2) that are secured together via a threaded coupling 103 (see FIG. 3A). However, in other embodiments the housing 102 could be a single piece or formed from two or more pieces coupled together in any manner now known or developed hereafter. Regardless, the first end 104 is configured to be attached to a regulator or cylinder fitting (described below) and, thus, the housing may include an external attachment feature 105 disposed proximate the first end 104. Similarly, the second end 108 is configured to be attached to a downstream gas line or component receiving regulated gas and, thus, the housing 102 may include an external attachment feature 109 proximate the second end 108. In the depicted embodiment, attachment features 105 and 109 are threads. However, in other embodiments, attachment features 105 and 109 may be or include any type of coupler (i.e., a snap engagement, a detent structure, etc.) that can be used to effectuate a sealed attachment on either end of the outlet assembly 100. In fact, the outlet assembly presented herein may be provided as a stand-alone component that can be attached to any desirable regulator, for example, to convert a regulator to a hybrid regulator (i.e., as a retrofit).

Figure 3B:
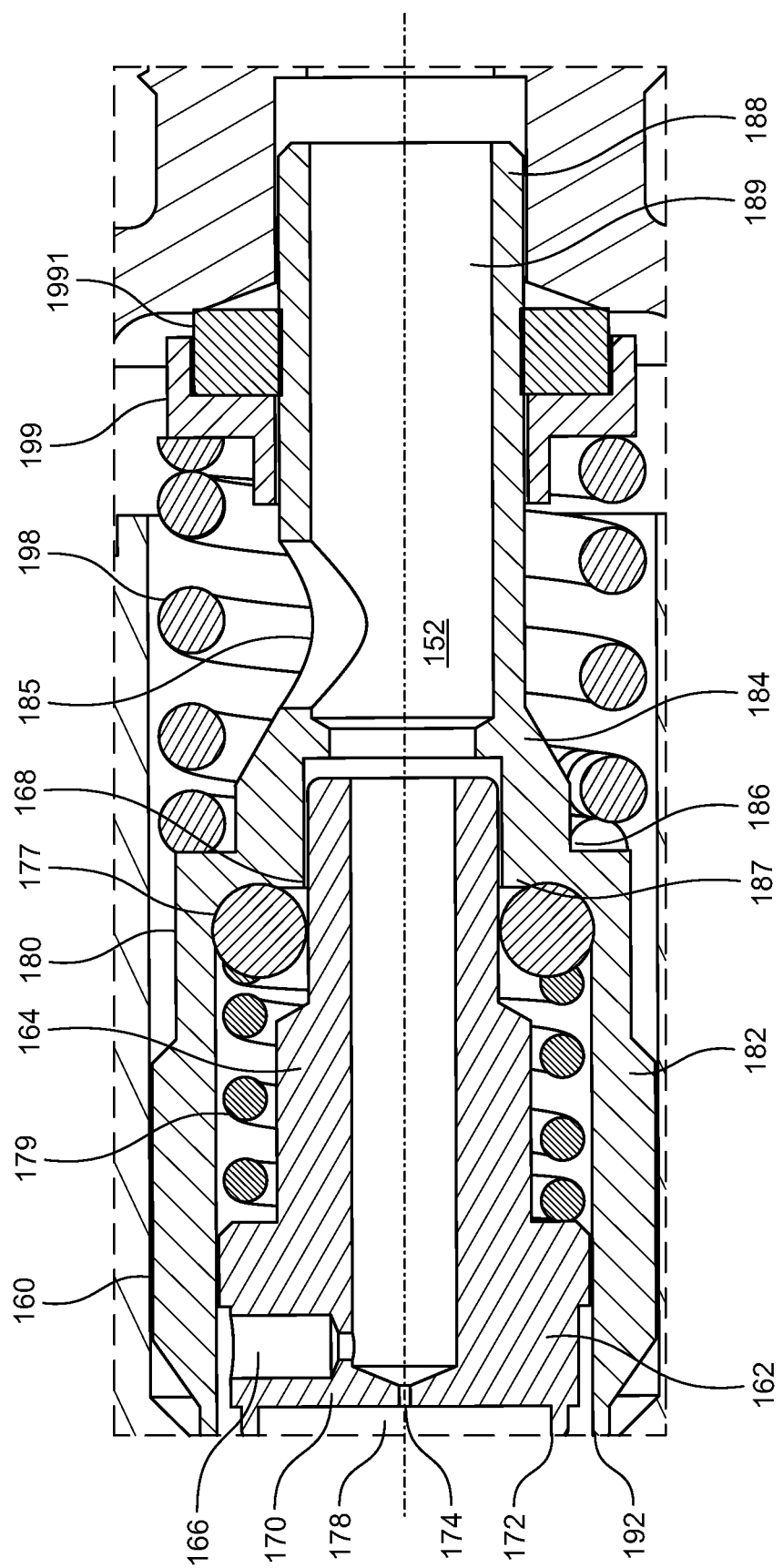
FIG. 3B is a detail view of a portion of the sectional view of FIG. 3A.

FIG. 3A shows another sectional view of the outlet assembly of FIG. 1. FIG. 3B shows a detailed view of a portion of the sectional view of FIG. 3A. Generally, the housing 102 defines an internal cavity 120. The internal cavity 120 may include various portions or parts to house components of the internal mechanism 150. For example, the internal cavity 120 may include a first portion 122, a second portion 126, and a third portion 132. The first portion 122 may extend inwards from the first end 104 and terminate at a shoulder 124 that creates a step between the first portion 122 and the second portion 126 against which a plug 140 may sit. The plug 140 includes an internal pathway 142 that allows gas to flow into the second portion 126 and the plug 140 also defines a sealing surface against which the internal mechanism 150 (e.g., movable poppet 160, bypass poppet 180, or both) may seal to form a backpressure chamber 178 adjacent the first portion 122 of the internal cavity 120.

In the depicted embodiment, the plug 140 is secured in place by threading an inlet member 144 into engagement with internal threads included on the housing 102 adjacent the first end 104 of the outlet assembly 100. After installation, the inlet member 144 also defines the inlet 106 of the outlet assembly 100. However, this is merely an example and the plug 140 can be secured within the first portion 122 of the internal cavity 120 in any desirable manner (e.g., with techniques that utilize an O-ring). Likewise, in different embodiments, the inlet 106 can be defined by a component in any desirable manner.

At the other end of the internal cavity 120, the third portion 132 (i.e., an outlet portion 132) extends inwards from the second end 108 to the second orifice 130, which connects the third portion 132 to the second portion 126. Due to its position, the second orifice 130 may contribute to controlling the flow rate of gas exiting the outlet assembly when the internal mechanism 150 included in the outlet assembly 100 is actuated to a second position P2 or a third position P3 (see FIGS. 6B and 6C), at least because it may control a maximum flow rate of gas exiting the outlet assembly 100.

The second portion 126 of the internal cavity 120 extends between the first portion 122 and the third portion 132. More specifically, the second portion 126 extends from the shoulder 124 of the first portion 122 (which is upstream of the internal mechanism 150) to the second orifice 130. The second portion 126 may be a stepped portion and may include one or more clearly defined steps (e.g., right angle steps, as opposed to an arced or gently sloping step) that can support the internal mechanism 150. For example, in the depicted embodiment, the second portion 126 includes an annular section 128 configured to receive a majority of the internal mechanism 150 and a step 129 against which the internal mechanism 150 may compress. In particular, in the depicted embodiment, the second biasing member 198 extends between the poppet 180 and a gland 199 that sits on a friction damper 1991 abutting step 129. Thus, if backpressure pushes the bypass poppet 180 downstream against the second biasing member 198 (as is described in further detail below), the backpressure will cause compression of the second biasing member 198 between the bypass poppet 180 and the step 129. The gland 199 and the friction damper 1991 may seal the space between the second biasing member 198 and the step 129 while providing a secure connection therebetween.

The second portion 126 also includes a generally unimpeded conduit 127, insofar as "unimpeded" is used to denote that the conduit 127 does not include a step or shoulder, that extends between the step 129 and the third portion 132 of the internal cavity 120. However, in other embodiments, the second portion 126 of the internal cavity 120 may also include sloping steps, funnel-shaped portions, or other features to support the internal mechanism 150 and direct any gas flowing through the second portion 126 to the second orifice 130. Likewise, although not shown, in other embodiments, the first portion 122 and the third portion 132 can also include sloping steps, funnel-shaped portions, or other features to assist with flow and/or pressure control, assembly, etc.

Now turning to FIG. 3B, as mentioned, the internal mechanism 150 includes a movable poppet 160 and a bypass poppet 180. At a high-level, the movable poppet 160 is disposed within (i.e., radially interior of) the bypass poppet 180 and is precisely dimensioned to slide or translate therein which, in turn, is precisely dimensioned to slide or translate within the internal cavity 120 of the housing 102. More specifically, the bypass poppet 180 has a main body 182 with a base portion 184, a conduit portion 188, and a seat portion 190. In the depicted embodiment, the base portion 184 is fixedly coupled to or formed unitarily with the conduit portion 188 and the seat portion 190 and each of these sections is dimensioned to fit within the internal cavity 120 of the outlet assembly 100 (e.g., within sections of the second portion 126 of the internal cavity 120). In fact, the base portion 184 is sized so that a small gap or annular passageway 196 (see FIG. 4) is formed between the base portion 184 and the portion of the housing 102 defining the annular section 128 of the second portion 126 of the internal cavity 120.

The conduit portion 188 may or may not be sized to form a gap between the conduit portion 188 and the housing 102; but, either way, the base portion 184 and the conduit portion 188 can move (e.g., slide or translate) within the second portion 126 of the internal cavity 120. Specifically, the base portion 184 can move (e.g., slide or translate) within the annular section 128 of the second portion 126 of the internal cavity 120 and the conduit portion 188 can move (i.e., slide) within the conduit 127 of the second portion 126 (of the internal cavity 120). However, notably, the base portion 184 is wider (i.e., has a larger diameter) than the conduit 127 of the internal cavity 120 and, thus, the base portion 184 cannot slide into the conduit 127. Instead, the base portion 184 of the main body 182 of the bypass poppet 180 has a length that is shorter than the length of the annular section 128 so that the base portion 184 can slide within the annular section 128. Likewise, the conduit portion 188 has a length shorter than the length of the conduit 127 so that the conduit portion 188 can slide (e.g., translate) within the conduit 127.

Since the conduit portion 188 of the main body 182 is fixedly coupled (or formed unitarily with) the base portion 184 and seat portion 190 of the main body 182, these portions move together (e.g., slide or translate together), e.g., based on forces exerted against the base portion 184. As mentioned above, this movement may be effectuated by backpressure in the backpressure chamber 178 formed at the upstream edge of the second portion 126 of the internal cavity 120. In at least some positions or configurations (i.e., stages), an annular flange 192 of the seat portion 190 (of the main body 182 of the bypass poppet 180) defines the peripheral boundary of the backpressure chamber 178. The annular flange 192 is configured to selectively mate with the plug 140 to selectively define this peripheral boundary, such as when the resiliency of second biasing member 198 urges the annular flange 192 into engagement (i.e., sealed contact) with the plug 140.

Overall, the bypass poppet 180 is hollow or annular so that the movable poppet 160 (i.e., the second portion 160 of the internal mechanism 150) can be positioned therein. This shape also ensures that gas can flow through the bypass poppet 180. In fact, the conduit portion 188 may include an unimpeded conduit 189 extending from the second auxiliary pathways 185 (discussed in further detail below) to or towards the second stage orifice 130 (depending on the position of the internal mechanism 150). Additionally, the base portion 184 of the bypass poppet 180 may define an external shoulder 186 and an internal shoulder 187. The external shoulder 186 provides a surface at which the second biasing member 198 may engage the bypass poppet 180. The internal shoulder 187 provides a surface at which the first biasing member 179 may engage the bypass poppet 180 (as explained in further detail below).

Figure 4:
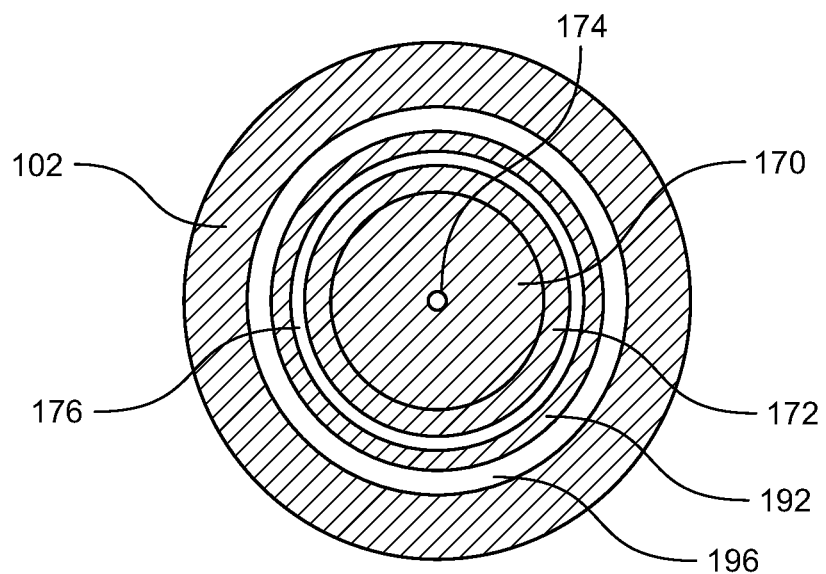
FIGS. 4 and 5 are sectional views of the outlet assembly of FIG. 1, taken along lines B-B and C-C of FIG. 3A, respectively.

Still referring to FIG. 3B, the movable poppet 160 has a main body 162 that includes a base portion 164, a conduit portion 168, and a seat 170 (similar to the bypass poppet 180). The base portion 164 is fixedly coupled to or formed unitarily with the conduit portion 168 and the seat 170 and each of these sections is dimensioned to fit within the base portion 184 of the bypass poppet 180. In fact, the base portion 164 is sized so that a small gap or annular passageway 196 is formed between the base portion 164 of the movable poppet 160 and the base portion 184 of the bypass poppet 180 (as is also shown in FIG. 4).

More specifically, the base portion 164 and the conduit portion 168 of the movable poppet 160 can move (e.g., slide or translate) within the base portion 184 of the bypass poppet 180. However, the internal shoulder 187 of the bypass poppet 180 defines a narrow downstream section within the base portion 184 of the bypass poppet 180. The base portion 164 of the movable poppet 160 is wider than this narrow section and, thus, the base portion 164 of the movable poppet 160 has a limited range of motion in a downstream direction. Instead, the range of motion is defined by the length of the base portion 164 of the movable poppet 160 and the length of the base portion 184 of the bypass poppet 180 (which is longer than the base portion 164). The base portion 164 of the movable poppet 160 is also stepped to provide space between the base portion 184 of the bypass poppet 180 and the base portion 164 of the movable poppet 160 in which the first biasing member 179 and an O-ring 177 may be positioned. For example, in the depicted embodiment, the first biasing member 179 extends between the internal shoulder 187 of the bypass poppet 180 and a step of the base portion 164 while the O-ring 177 is positioned adjacent the internal shoulder 187.

The seat 170 defines an upstream end of the movable poppet 160 and includes the first orifice 174, which is centered on the seat 170 in the depicted embodiment. Except for the first orifice 174, the seat 170 defines a transverse boundary of the backpressure chamber 178 (e.g., a boundary extending transversely or orthogonally with respect to the primary flow direction). The seat 170 also includes annular flange 172 that is configured to selectively mate with the plug 140 to selectively define the peripheral boundary of the backpressure chamber 178 (e.g., when the internal mechanism 150 is in a first or non-actuated position/stage P1).

Thus, when backpressure builds in the backpressure chamber 178, the backpressure will push the seat 170 downstream. Initially, this downstream force will cause the movable poppet 160 to move within the bypass poppet 180, with the base portion 164 translating towards the internal shoulder 187 and the conduit portion 168 translating further beyond the internal shoulder 187. Downstream translation of the movable poppet 160 will also disengage the annular flange 172 from the plug 140 and open the first annular passageway 176, as is described in further detail below. However, eventually, the resilient force exerted by the first biasing member 179 will be stronger than the resilient force exerted by the second biasing member 198 (on the bypass poppet 180) and/or the movable poppet 160 will be unable to slide any further (e.g., if the base portion 164 is contacting the internal shoulder 187 and/or O-ring 177). At this point, the backpressure acting against the seat 170 (in the backpressure chamber 178) will cause at least the bypass poppet 180, if not both the bypass poppet 180 and the movable poppet 160, to translate downstream.

FIG. 4 is a sectional view of the outlet device taken along line B-B of FIG. 3A. As can be seen in FIG. 4A, the first orifice 174 has a relatively small diameter (e.g., in the range of approximately 0.005 inches to approximately 0.015 inches, such as 0.0083 inches). Thus, when gas enters the inlet 106 of the outlet assembly 100, not all of the gas will be able to flow through the first orifice 174 into the main pathway 152. Instead, initially, gas that flows into the inlet 106 (e.g., flow F1) will generate backpressure in the backpressure chamber 178 adjacent the first orifice 174. When the backpressure reaches a first pressure threshold, the backpressure will actuate the internal mechanism 150, moving the internal mechanism 150 from its first position P1 (see FIG. 6A) to a second position P2 (see FIG. 6B). This first actuation opens the first annular passageway 176 between the first portion 160 of the internal mechanism 150 (i.e., the movable poppet 160) and the second portion 180 of the internal mechanism 150 (i.e., the bypass poppet 180).

More specifically, initially (i.e., before backpressure reaches a first pressure threshold), the annular flange 172 of the movable poppet 160 and the annular flange 192 of the bypass poppet 180 will both be engaged with the plug 140. Since the annular flange 172 is disposed radially interiorly of the annular flange 192, the annular flange 172 of the movable poppet 160 defines the peripheral boundary of the backpressure chamber 178 when both annular flanges 172 and 192 are engaged with the plug 140. Then, when the backpressure reaches the first pressure threshold, the annular flange 172 will disengage from the plug 140 and open the first annular passageway 176. However, the annular flange 192 will remain engaged with the plug 140 until the backpressure reaches a second pressure threshold, greater than the first pressure threshold. Thus, when the backpressure is above the first pressure threshold but below a second pressure threshold, the annular flange 192 of the bypass poppet 180 will define the peripheral boundary of the backpressure chamber 178. Then, if the backpressure in the backpressure chamber 178 reaches a second pressure threshold, the backpressure will push the movable poppet 160 against the bypass poppet 180 with enough force that the bypass poppet 180 can overcome the resistance of the second biasing member 198 and translate in a downstream direction. Translation of the bypass poppet 180 in a downstream direction opens the second annular passageway 196.

Figure 5:
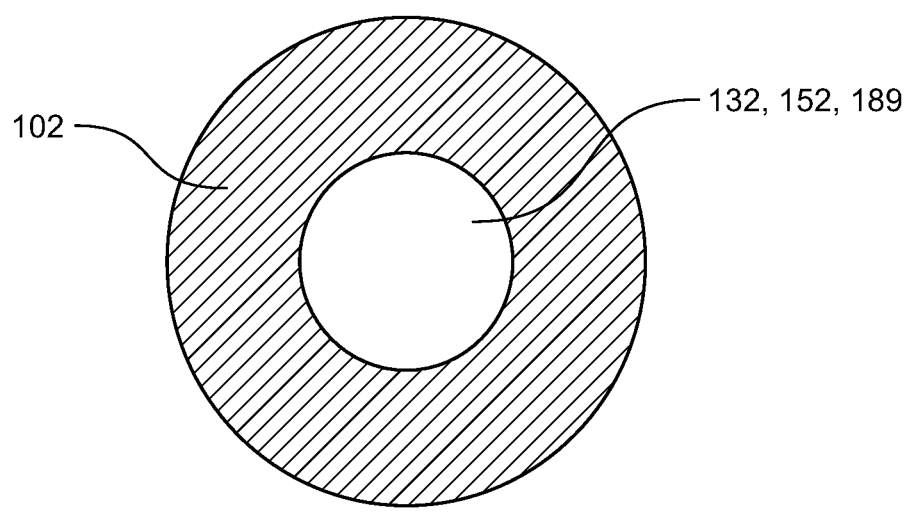

FIG. 5 is a sectional view of the outlet assembly 100 taken along line C-C of FIG. 3A. As can be seen, the second orifice 130 is substantially larger than the first orifice 174 (although these images are not necessarily to scale). Thus, the second orifice 130 may be capable of supporting higher flow rates than the first orifice 174 and features of the internal mechanism 150 may cooperate to regulate the flow rate of gas flowing through the second orifice 130.

Figure 6A:
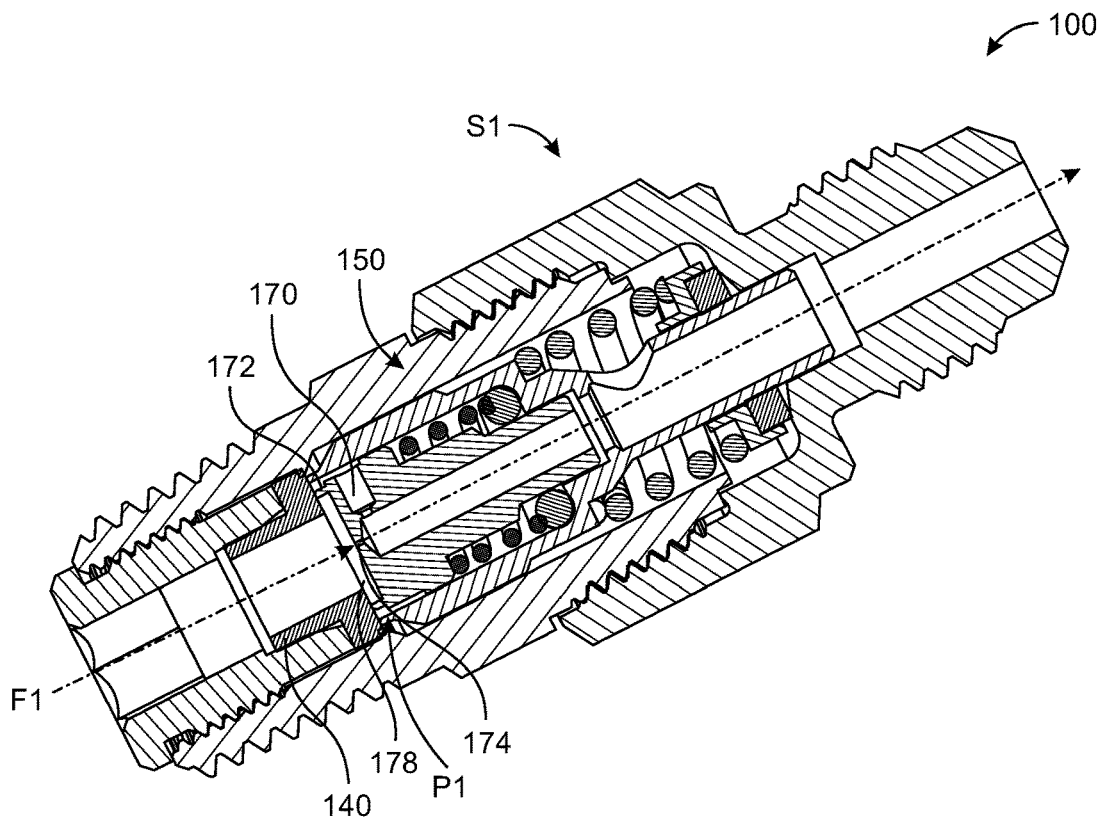
FIGS. 6A-6C illustrate the outlet assembly in different stages or operating positions, according to an example embodiment.
Figure 6B:
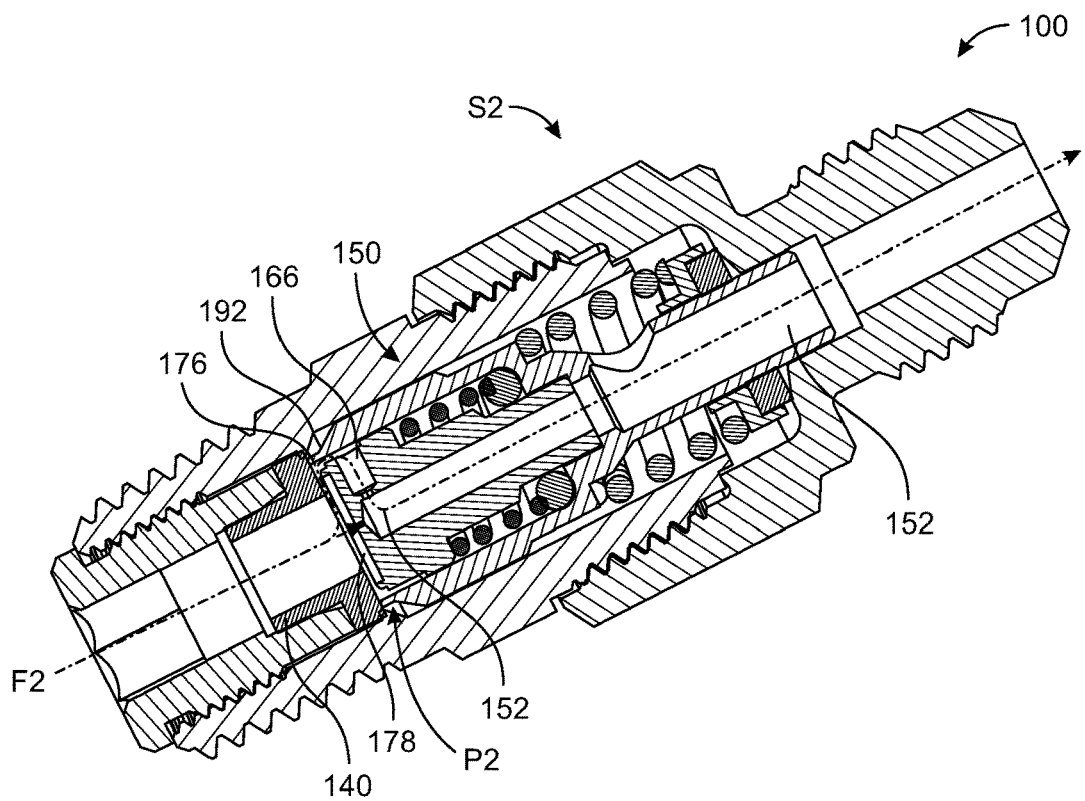
Figure 6C:
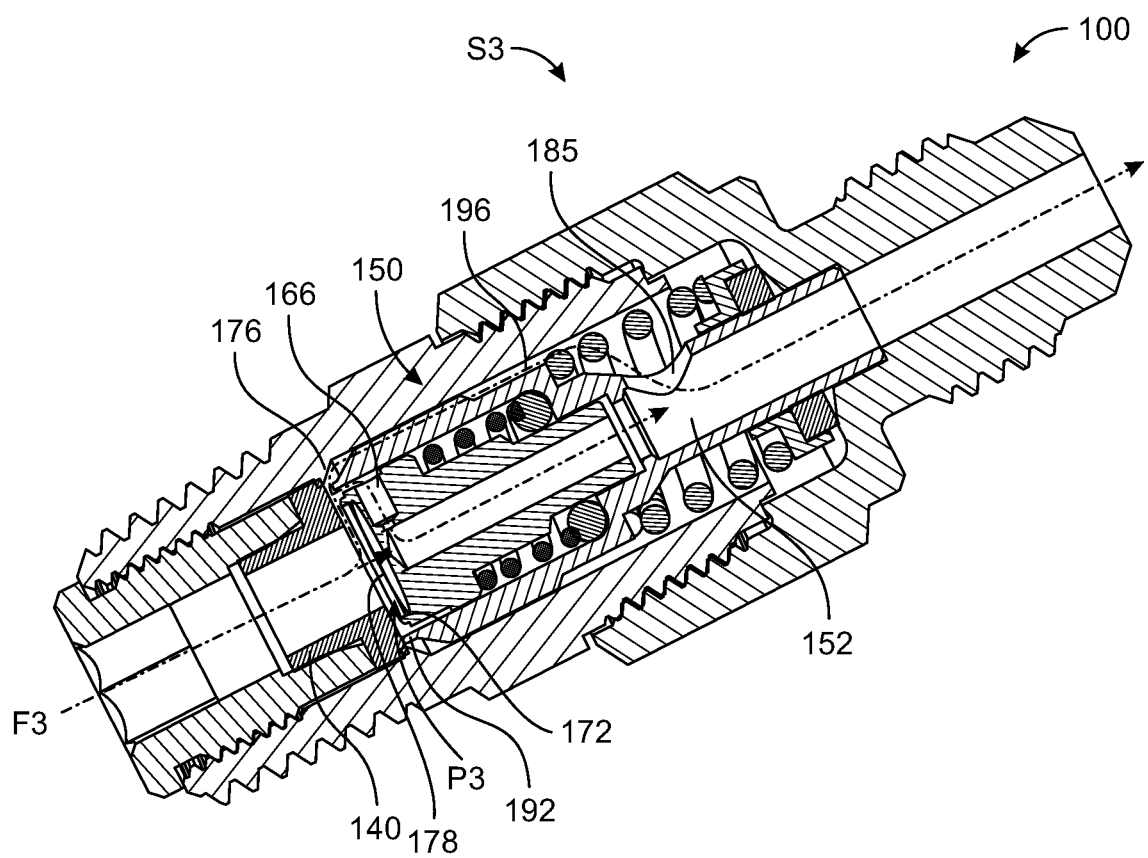

FIGS. 6A-6C illustrate the flow paths of a flow of gas moving through the outlet assembly when the first orifice 174/internal mechanism 150 is in the first position P1 (first stage), the second position P2 (second stage), or the third position P3 (third stage). Generally, the internal mechanism 150 defines multiple flow paths through the outlet assembly 100, each of which aligns flow areas of different sizes with gas flowing through the outlet assembly. That is, the internal mechanism 150 is primarily responsible for automatically shifting or changing the path of gas flowing through the outlet assembly 100. More specifically, the internal mechanism 150 works with a plug 140 to define chambers and/or seal pathways to cause gas to flow along specific pathways through the outlet assembly 100. As mentioned, the plug 140 may be fixedly secured within the internal cavity 120 so that, for example, the internal mechanism 150 can selectively cooperate with the plug 140 to create or adjust the volume of a backpressure chamber 178 at the upstream edge of the second portion 126 of the internal cavity 120 (e.g., upstream of the internal mechanism 150). In at least some embodiments, the internal mechanism 150 cooperates with the plug 140 by compressing annular features (e.g., flange 172 and/or 192) against a seal or O-ring (not shown) included at a distal end of the plug 140 (i.e., an interior or downstream end of the plug).

In particular, as shown in FIG. 6A, when the internal mechanism 150 is in a first position P1, the outlet assembly operates in a first stage S1 and gas entering the outlet assembly flows through the first orifice 174 (e.g., a 0.0083 inch orifice) and both seat portions 170 and 190 of the internal mechanism 150 are sealed against the plug 140 to seal the first annular passageway 176 and the second annular passageway 196. Additionally, in stage S1, the conduit portion 168 of the movable poppet 160 connects to and/or defines the main pathway 152 of the outlet assembly 100. Thus, when the outlet assembly 100 is in the first stage S1, gas flows relatively straight through the outlet assembly along flow path F1. On flow path F1, the size of the first orifice 174 may regulate the flow of the gas to flow rates that are generally suitable for brazing (e.g., 3-6 CFH).

As mentioned, over time, gas flowing into the backpressure chamber 178 creates backpressure against the internal mechanism 150, which eventually actuates the first portion 160 of the internal mechanism 150 (e.g., the movable poppet 160). This pushes the first portion 160 of the internal mechanism 150 against the first biasing member 179 (and the second biasing member 198) until eventually, the pushing force generated by the backpressure overcomes the biasing force of the first biasing member 179. The first biasing member 179 is substantially weaker (e.g., smaller and/or thinner) than the second biasing member 198 and, thus, the force of the first biasing member 179 will be overcome prior to the force of the second biasing member 198. As is described in detail above, the internal mechanism 150 and the second portion 126 of the internal cavity 120 of the outlet assembly 100 are shaped and sized to allow portions of the internal mechanism 150 to move (e.g., slide) within the internal cavity 120.

Now turning to FIG. 6B, when the backpressure reaches a first threshold (e.g., 125 pounds per square in gauge (psig)), the internal mechanism 150 moves the first orifice 174 to a second position P2. That is, the first portion 160 of the internal mechanism 150 moves in a downstream direction, against the first biasing member 179, so that the outlet assembly 100 moves into a second stage S2 of operation. Put another way, when gas flowing through the outlet assembly 100 exerts enough force on the internal mechanism 150 (e.g., via seat 170) to overcome a biasing force of the first biasing member 179, the first portion 160 of the internal mechanism 150 slides from a first position P1 (FIG. 6A) to a second position P2 (FIG. 6B). When the first portion 160 of the internal mechanism 150 is in a second position P2 (FIG. 6B), the annular flange 172 of the first portion 160 of the internal mechanism 150 no longer engages the plug 140 and opens the first annular passageway 176.

Notably, during this first actuation, the second portion 180 of the internal mechanism (e.g., the bypass poppet 180) does not move or slide. Instead, the strength of the biasing force of the second biasing member 198 allows the second portion 180 to remain engaged with the plug 140, sealing the second annular passageway 196. However, the shape and size of the base portion 164 of the movable poppet 160 ensures that the movable poppet 160 is retained within the bypass poppet 180 during actuation of the movable poppet 160.

Still referring to FIG. 6B, when the first portion 160 of the internal mechanism 150 in its second position P2, gas flows through the outlet device along a second flow path F2. Like the first flow path F1, gas flows through the plug 140 and into the backpressure chamber 178 (the chamber being upstream of the first orifice 174), but now, the chamber 178 is no longer sealed by annular flange 172. That is, the annular flange 172 of the first portion 160 of the internal mechanism 150 is no longer engaged or mated with the plug 140 and, thus, the first annular passageway 176 is accessible from the chamber 178. The first annular passageway 176 defines an opening with an overall surface area that is substantially larger than the surface area of the first orifice 174 (as depicted in FIG. 4) and, thus, the gas flow F2 may primarily flow through the first annular passageway 176 (i.e., because flowing gas follows the path of least resistance), as is shown in FIG. 6B. Consequently, the gas flow F2 will primarily bypass the first orifice 174, primarily flowing through into the first annular passageway 176 and back into the main pathway 152 via the one or more first auxiliary pathways 166. The O-ring 177, which is disposed downstream of the first biasing member 179 can prevent leakage between the first portion 160 and the second portion 180 of the internal mechanism 150.

Once the gas reenters the main pathway 152, it can flow towards the outlet 110 via the second orifice 130. Thus, the flow rate will be primarily regulated by the first annular passageway 176 and the one or more first auxiliary pathways 166 to a flow rate that is higher than a flow rate achieved in the first stage S1. For example, the first annular passageway 176 and the one or more first auxiliary pathways 166 may regulate the gas flow F2 to a flow rate of, for example, 20-50 CH., which may be suitable flow rates for purging.

If the backpressure in the backpressure chamber 178 dissipates while the outlet assembly is operating in the second stage (e.g., with internal mechanism 150 in position P2), the first biasing member 179 causes the first portion 160 of the internal mechanism 1150 150 to automatically slide back to its first position P1. In at least some uses of the depicted embodiment, the first portion 160 of the internal mechanism 150 slides approximately horizontally within the internal cavity 120 when moving between its first position P1 and the second position P2 (i.e., if the outlet device 100 is oriented as shown in FIG. 3); however, in other embodiments, the first portion 160 of the internal mechanism 150 can slide along any axis oriented in any direction (i.e., because the outlet assembly 100 may be oriented in any position with respect to a regulator or cylinder).

Alternatively, and now referring to FIG. 6C, if the backpressure in backpressure chamber 178 increases past a second threshold, the internal mechanism will move the first orifice 174 to a third position P3 and open the second annular passageway 196 so that the outlet assembly 100 operates in a third stage S3. As an example, the second pressure threshold may be 250 psig. Opening the second annular passageway 196 may create yet another flow path through the outlet assembly that primarily bypasses the first orifice 174, as shown by flow path F3.

More specifically, when the backpressure in backpressure chamber 178 reaches the second threshold, the backpressure may overcome the biasing force of the second biasing member 198 (which is acting on the second portion 180 of the internal mechanism 150) and push the second portion 180 of the internal mechanism 150 downstream. This unseals the annular flange 192 of the second portion 180 of the internal mechanism 150 from the plug 140 and opens the second annular passageway 196. Gas flowing through the second annular passageway 196 passes around the second portion 180 of the internal mechanism 150 (between the second portion 180 of the internal mechanism 150 and the outlet assembly housing 102) and through the second biasing member 198 before reentering the main pathway 152 via one or more second auxiliary pathways 185. A friction damper 1991 (or another seal, such as an O-ring) may be disposed downstream of the second biasing member 198 to prevent leakage between the second portion 180 of the internal mechanism 150 and the housing 102 of the outlet assembly 100 (e.g., at the step 129 between the second portion 126 and the third portion 132 of the internal cavity 120).

Once the gas reenters the main pathway 152, it can flow towards the outlet 110 via the second orifice 130. Thus, the flow rate will be collectively regulated by the first annular passageway 176, the second annular passageway 196, the one or more first auxiliary pathways 166, the one or more second auxiliary pathways 185, and the second orifice 130 to a flow rate that is higher than a flow rate achieved in the first stage or the second stage (i.e., positions P1 or P2). However, in at least some embodiments, the second annular passageway 196 may be larger than the first annular passageway 176. That is, the cross-sectional area of the second annular passageway 196 may be larger than the cross-sectional area of the first annular passageway 176. It may also be larger than the combined cross-sectional area of the first orifice 174 and the first annular passageway 176. In these embodiments, gas flowing through the outlet assembly along path F3 may primarily bypass the first orifice 174 and the first annular passageway 176 when the outlet assembly 100 is in its third stage S3 (e.g., when the first orifice in its position P3) so that the second annular passageway 196 and the one or more second auxiliary pathways 185 primarily regulate/control the flow rate in the third stage S3.

Notably, regardless of how flow is regulated/controlled in the third stage S3, the flow rate through the outlet assembly 100 will be increased and/or maximized. For example, the third stage (position P3) may regulate the gas flow F3 to a flow rate of, for example, over 50 CFH, which may be suitable for supporting efficient pressure testing. Example flow rates are shown in FIG. 16. Alternatively, the third stage S3 may be referred to as providing unregulated flow. Generally, the higher flow rates provided by the third stage S3 may provide significant productivity benefits for higher pressure gas uses as compared to comparative assemblies that provide gasses at these pressures (e.g., for pressure testing) at lower flow rates. For example, pressure testing may be completed faster and more efficiently with the higher flow rates provided by the third stage S3.

Still referring to FIG. 6C, when the backpressure in the backpressure chamber 178 increases past the second threshold and causes the second portion 180 of the internal mechanism 150 to move in a downstream direction, the first portion 160 of the internal mechanism 150 may move with the second portion 180 of the internal mechanism 150 (at least because the first biasing member 179 is weaker than the second biasing member 198). However, the first portion 160 of the internal mechanism 150 need not move in lockstep with the second portion 180 of the internal mechanism 150 and can move in any manner with respect to the second portion 180 of the internal mechanism 150. Moreover, if the backpressure in the chamber 178 dissipates below the second threshold while the outlet assembly 100 is operating in the third stage, the second biasing member 198 causes the second portion 180 of the internal mechanism 150 to automatically slide back to its sealing position P2 (e.g., to its position in the second stage S2). Then, or simultaneously, if the backpressure in backpressure chamber 178 dissipates below the first threshold, the first biasing member 179 causes the first portion 160 of the internal mechanism 150 to automatically slide back to its first position P1 (e.g., as shown in the first stage S1).

Figure 7:
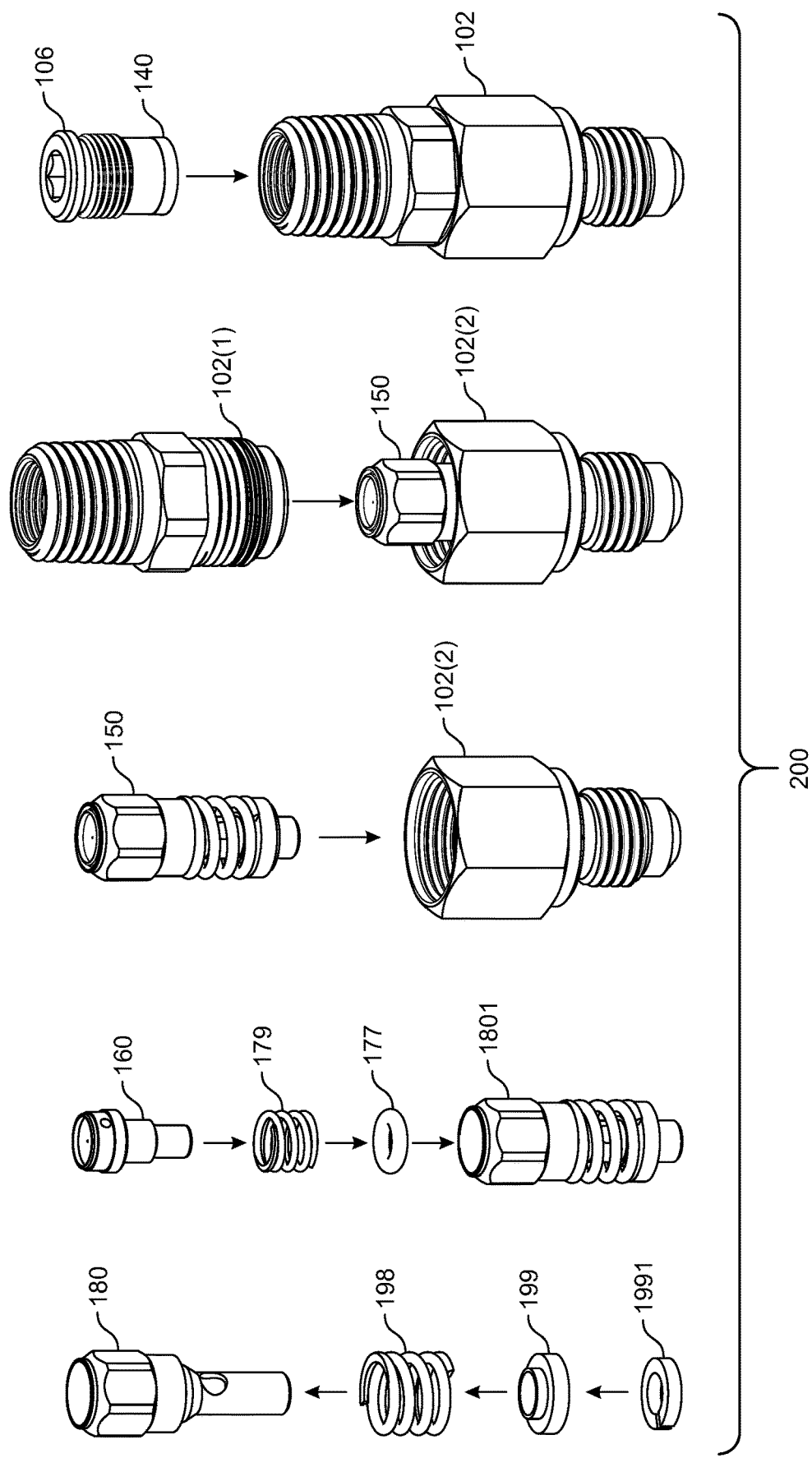
FIG. 7 illustrates a method of assembling the outlet assembly of FIG. 1, according to an example embodiment.

FIG. 7 illustrates a method 200 for assembling the outlet assembly presented herein. Notably, in this example embodiment, the two-part housing 102 facilitates a relatively straightforward installation of the internal mechanism 150. Spherically, the two-part housing 102 enables a five step assembly with minimal or no tools. However, method 200 is only one example and, in other embodiments, other techniques may be used to assembly the outlet assembly presented herein with a body formed from one or more pieces/parts. That said, for completeness, method 200 is now described in detail.

First, in Step 1, the second biasing member 198, gland 199, and friction damper 1991 are slid onto a downstream end of the bypass poppet 180, forming a bypass poppet sub-assembly 1801 (see Step 2). The gland 199 and friction damper 1991 may be secured on a downstream end of the second biasing member 198 (e.g., via a friction or press fit) and the second biasing member 198 may extend between the gland 199 and the external shoulder 186 of the bypass poppet 180. In Step 2, the movable poppet 160, the first biasing member 179, and the O-ring 177 are installed within the bypass poppet sub-assembly 1801. The O-ring 177 is installed first and the first biasing member 179 extends between the O-ring 177 and the main body 162 of the movable poppet 160. This completes the assembly of the internal mechanism 150.

In Step 3, the downstream end of the internal mechanism 150 is inserted into the second portion 102(2) of the outlet assembly housing 102. Specifically, the conduit portion 188 is seated within the second portion 102(2) of the outlet assembly housing 102, in alignment with the second orifice 130 (which is defined by the second portion 102(2)). Then, in Step 4, the first portion 102(1) is installed over the upstream end of the internal mechanism 150. In the depicted embodiment, the first portion 102(1) is secured to the second portion 102(2) via threaded coupling 103. Finally, in Step 5, the plug 140 is installed into the first end 104 of the outlet assembly housing 102, to define the inlet 106. In the depicted embodiment, the plug 140 is fixedly coupled to the inlet member 144, which is securable to the first portion 102(1) of the housing 102 via threads. With this assembly method 200, if any parts of the internal mechanism or housing 102 need to be examined, replaced, adjusted, etc., the parts will be easily accessible and replaceable. Furthermore, this assembly method 200 can enable users to easily reassemble the outlet device 100 with subassemblies instead of trying to manage many small parts.

Figure 8:
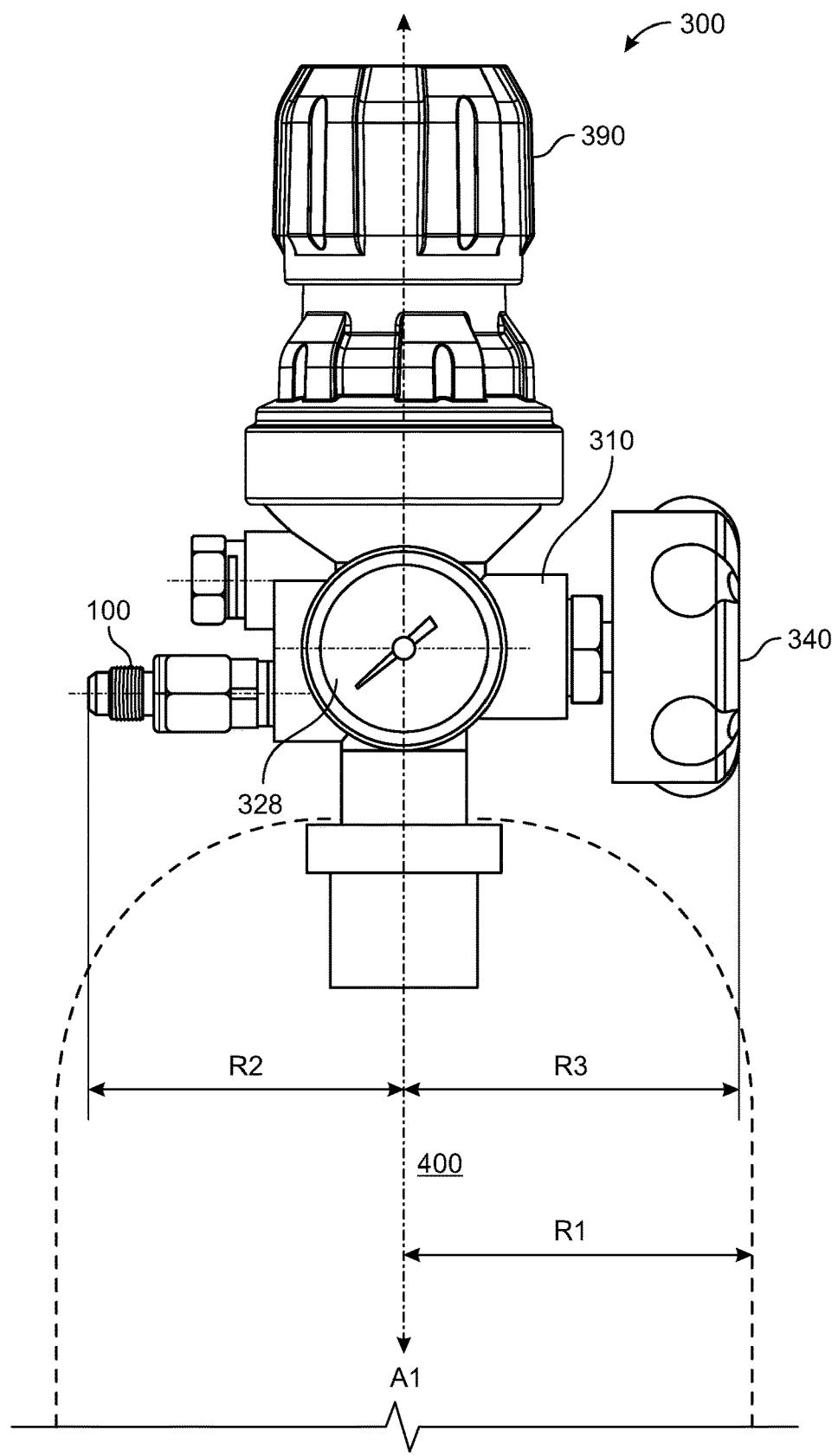
FIG. 8 illustrates an example embodiment of a hybrid pressure and flowgauge fitting including the outlet assembly of FIG. 1.
Figure 9A:
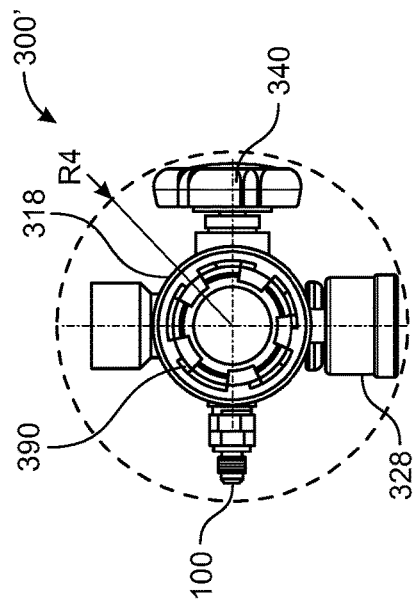
FIGS. 9A-9D illustrate top, left side, right side, and front views of another example embodiment of a hybrid pressure and flowgauge fitting including the outlet assembly of FIG. 1.
Figure 9D:
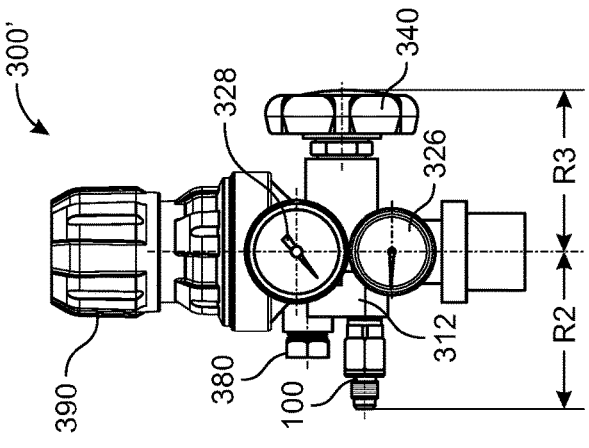
Figure 9C:
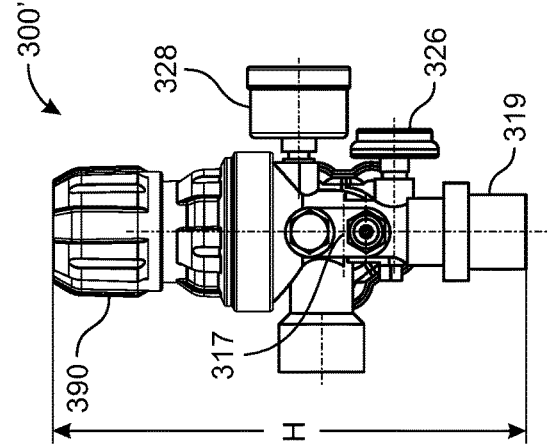
Figure 9B:
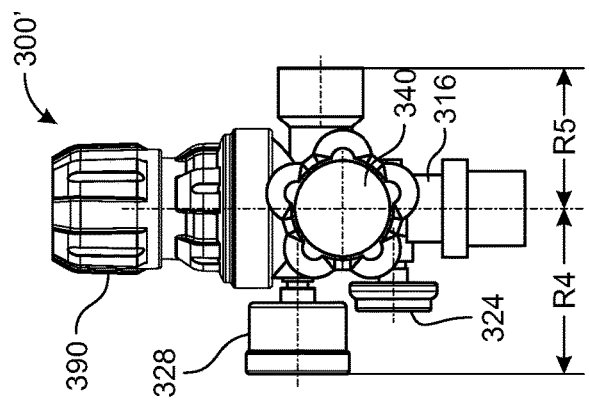

FIG. 8 is a front view of a cylinder 400 with a first embodiment of a cylinder fitting 300 that includes the outlet assembly 100 presented herein. FIGS. 9A-9D illustrate front, top, right and left views (organized around a front view) of a second embodiment of a cylinder fitting 300' that also includes the outlet assembly 100 presented herein. In FIG. 8, the cylinder fitting 300 is shown on a cylinder 400 (shown in dashed lines) while FIGS. 9A-9D illustrate cylinder fitting 300' without the cylinder. However, it is to be understood that either cylinder fitting 300 or cylinder fitting 300', as well other embodiments of cylinder fittings, can be irremovably coupled to a cylinder 400 (e.g., a refillable gas cylinder).

Additionally, in at least some embodiments, the outlet assembly presented herein can be irremovably coupled to any cylinder fitting (e.g., fitting 300 or 300') which, in turn, can be irremovably coupled to a cylinder. Then, the cylinder fitting can then be transported and used without having to locate, acquire, track, etc. a fitting. In fact, since the fitting presented herein (e.g., fitting 300 or 300') provides hybrid pressure and flowgauge regulation, a user need not carry a single regulator with the cylinder. By comparison, if a cylinder does not include a hybrid fitting, a user may need to carry a pressure regulator, a flowgauge regulator, and a cylinder to a worksite. That said, in other embodiments, a fitting (e.g., fitting 300 or 300') might be removably coupleable to a cylinder (e.g., cylinder 400) and/or the outlet assembly 100 might be removably coupleable to the cylinder fitting (e.g., fitting 300 or 300').

In the depicted embodiments, the pressure adjustment mechanism 390 (and pressure regulator) is vertically oriented above the gas cylinder 400 (e.g., coaxial with a longitudinal axis of the gas cylinder) and the outlet assembly 100 is horizontally oriented with respect to the longitudinal axis A1 of the gas cylinder (e.g., perpendicular to the longitudinal axis A1 of the gas cylinder). That is, in the two embodiments depicted in FIGS. 8 and 9A-9D, fittings 300 and 300' each have a pressure control 390 positioned at a top 320 of the fitting and an outlet assembly 100 oriented perpendicular to the pressure control 390. However, in other embodiments, the pressure adjustment mechanism 390 (and pressure regulator), as well as the outlet assembly 100, can be positioned in any orientation with respect to the gas cylinder (including angular orientations).

Moreover, in the depicted embodiments, the fittings each have an on/off control 340 positioned on a first side 316, a safety device 380 (e.g., a bursting disc or relief valve) on a second side 317 that is opposite the first side 316 (together with the outlet assembly 100), and a hybrid gauge 328 positioned on a front 312 of the fitting (described in further detail below in connection with FIG. 14). The main difference between the two embodiments is that the embodiment shown in FIG. 8 also has an inlet gauge 326 that provides an indication of gas pressure for gas entering the fitting via an inlet 330 included at the bottom 319 (e.g., gas from the cylinder). However, in other embodiments, these components may be arranged in any desirable arrangement, including on the back 318 of the fittings. Additionally or alternatively, a fitting need not include all of these components and/or can include additional components. For example, a fitting might not include an on/off control 340 and/or a safety device 380. As another example, a fitting might include two safety devices 380 (e.g., a bursting disc and a relief valve).

Regardless of the specific features included on a fitting, the cylinder fittings presented herein may have an outer radial dimension equal that is equal to or smaller than a cylinder radius R1 (e.g., equal to or less than 3.5 inches). In the depicted embodiments, the hybrid gauge 328 has the largest radial dimension R4 (e.g., approximately 2.69 inches), and the outlet assembly 100, on/off control 340, and back 318 of the fitting 300 may have smaller radial dimensions of R2 (e.g., approximately 2.56 inches), R3 (e.g., approximately 2.61 inches), and R5 (e.g., approximately 2.28 inches), respectively. Additionally, with the illustrated designs, fittings 300 and 300' may have a compact height H (e.g., approximately 7.68 inches). Although the dimensions are only illustrated in FIGS. 9A-9D, the dimensions are applicable to fitting 300 and fitting 300'.

Figure 10:
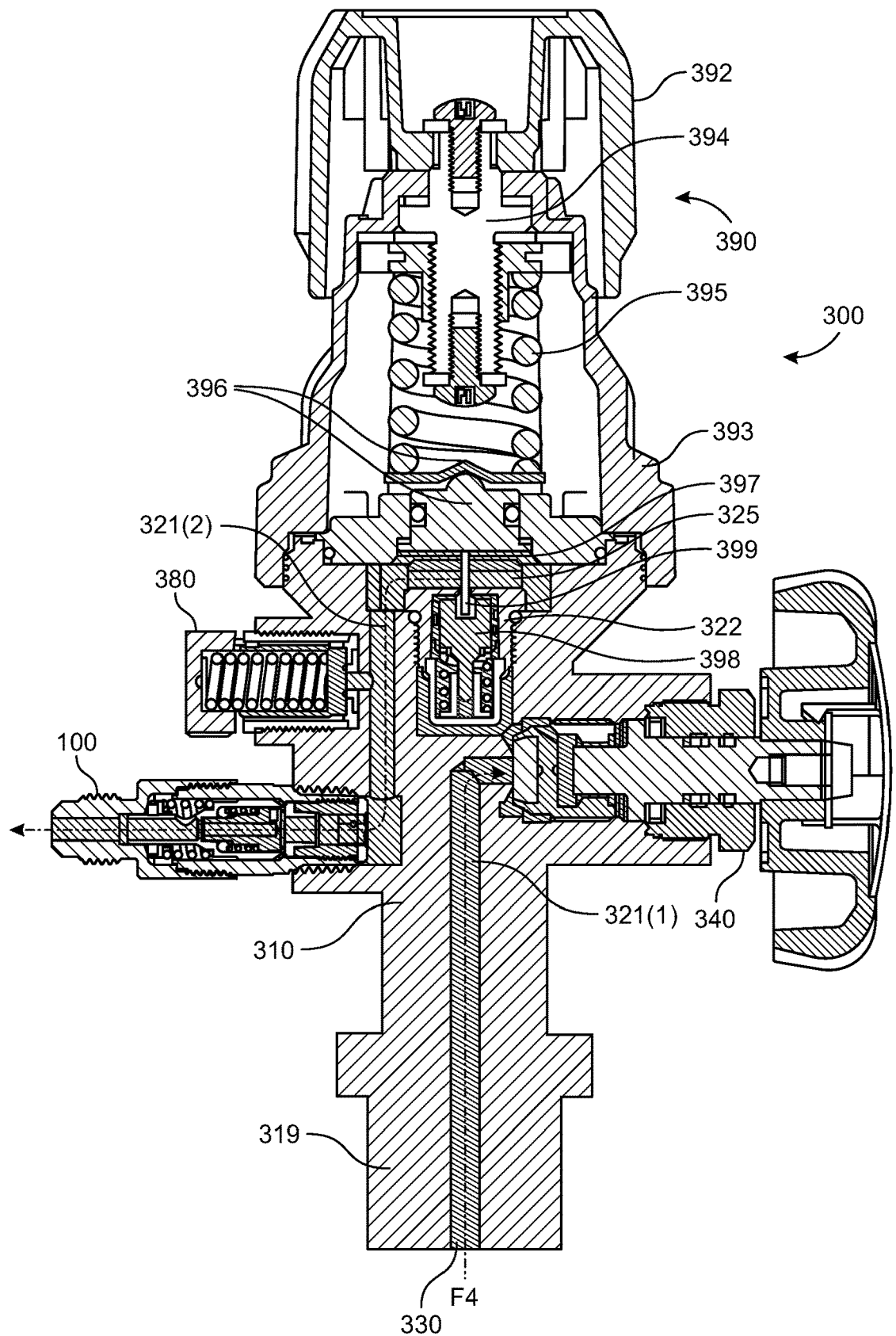
FIG. 10 illustrates a sectional view of the fitting of FIG. 8, showing a flow path through the fitting.

FIG. 10 is a sectional view of the fitting 300 of FIG. 8. As can be seen, when high-pressure gas enters the fitting 300, the high-pressure gas flows past the on/off control 340 into a pressure adjustment mechanism 390. The pressure adjustment mechanism 390 can be actuated (e.g., rotated) to regulate the pressure of the high-pressure gas flow down to a desired pressure. The pressure-regulated gas (e.g., low-pressure gas flow) then flows to the outlet assembly 100, which can automatically control flow rate based on back-pressure created by the low-pressure gas flow. Consequently, a user will be able to easily regulate gas exiting the cylinder to appropriate flow rates for brazing and purging and appropriate pressures for pressure testing without using any additional equipment, such as stand-alone regulators.

More specifically, the fitting body 310 defines channels 321(1) and 321(2) that allow gas from the inlet 330 to flow to the outlet assembly 100. Additionally, the fitting body 310 includes or defines a seat 322 that, together with portions of the adjustment mechanism 390 (which are described in further detail below), defines a throttle chamber 325. As is implied by the name, the adjustment mechanism 390 can adjust one or more dimensions, such as the width, of the throttle chamber 325 to throttle the flow of high pressure gas from the inlet 330 before the gas reaches the outlet assembly 100.

In the depicted embodiment, the adjustment mechanism 390 includes a graspable portion 392 that can be rotated or spun by a user in order to actuate the adjustment mechanism 390. The graspable portion 392 is movably mounted on a fixed portion 393 that is fixedly coupled to the fitting body 310. More specifically, the graspable portion 392 can be moved along the fixed portion 393 (as it is rotated) so that actuation (i.e., rotation) of the graspable portion 392 moves the graspable portion 392 towards or away from the fitting body 310. When the graspable portion 392 moves towards the fitting body 310, an actuating assembly 394 included in or coupled to the graspable portion 392 compresses a biasing member 395, which, in turn, exerts a lateral force on a piston and/or diaphragm 396. The piston/diaphragm 396 transfers this force to a stem 399, which acts against a chamber poppet 398 to adjust a dimension (i.e., the width) of the throttle chamber 325 of the fitting body 310. More simply, actuating the adjustment mechanism 390 opens or closes pathways through the fitting body 310 in order to control the throttling of gasses flowing there through. In some embodiments, the adjustment mechanism 390 may also include a diaphragm chamber 397, into which a portion of the gas flowing through fitting body 310 (i.e., through channel 321(2)) may flow to balance the forces exerted by or on the adjustment mechanism 390.

Since the sectional view of FIG. 10 bisects the fitting body 310, the inlet 330, and the outlet assembly 100, the sectional view of the fitting 300 clearly illustrates a flow path F4 through the fitting. The flow path F4 is a high-level flow path and it is not intended to illustrate the particular flow path through the outlet assembly 100, which is described in further detail herein. That being said, the flow path F4 accurately depicts gas entering the fitting 300 (e.g., from a cylinder to which the fitting is connected) via the inlet 330 and flowing into the first channel 321(1) formed in the fitting body 310. The channel 321(1) guides the gas flow to the chamber 325, the dimensions of which can be controlled by the adjustment mechanism 390 to throttle the gas flow, as is described above. The gas then exits the chamber 325 through a second channel 321(2) that guides the gas flow to the outlet assembly 100. The gas then flows through the outlet assembly 100 in the manner described above in connection with FIGS. 6A-6C.

Figure 11:
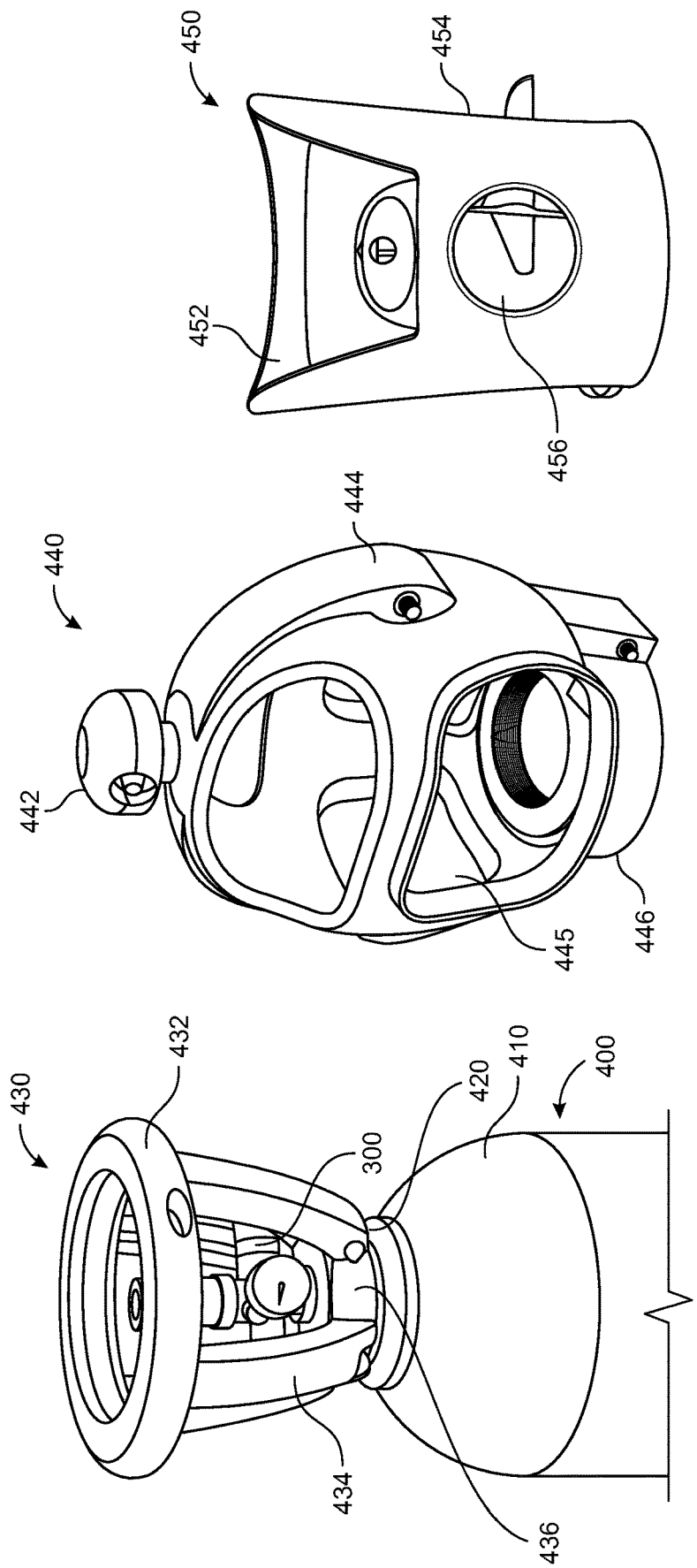
FIGS. 11A-11C illustrate fitting guards that may be included on and/or around a hybrid pressure and flowgauge fitting, according to example embodiments.

FIGS. 11A-11C illustrate example fitting guards that may be included on/around a cylinder fitting to provide protection for the fitting and/or outlet assembly. First, in FIG. 11A, fitting guard 430 is a tapered fitting with an annular top handle 432, a base 436, and tapered struts 434 that extend between the handle 432 and the base 436. The base 436 is sized to closely conform to the outlet 420 of the tank and the handle 432 provides an easily accessible and graspable grip for transportation. However, importantly, the handle 432 has a larger diameter than the fitting 300 and, thus, protects the fitting 300 from impact (e.g., in case of a fall).

The fitting guard 440 in FIG. 11B provides similar protection with struts 444 that extend between a top 442 and bottom 446 of the fitting 440. However, the struts 444 extend horizontally, vertically, and somewhat spherically to form an enclosure that closely conforms to the shape of the fitting 300 while providing large windows 445 at the front, back, and a side of the fitting guard 450. Additionally, in the depicted embodiment, the top 442 of fitting guard 440 is a knob that a user can grasp.

The fitting guard 450 shown in FIG. 11C also provides protection, but substantially encases the fitting 300 within an enclosure 454 with a gauge window 456. This may substantially hide the fitting 300 so that, for example, cords or wires cannot snag or catch on the fitting 300 (or in any way access the fitting 300) while still allowing a user to view a gauge (via window 456). Fitting guard 450 may also have a top handle, but it may be less robust since the enclosure 454 can provide impact protection for the fitting 300.

Figure 12:
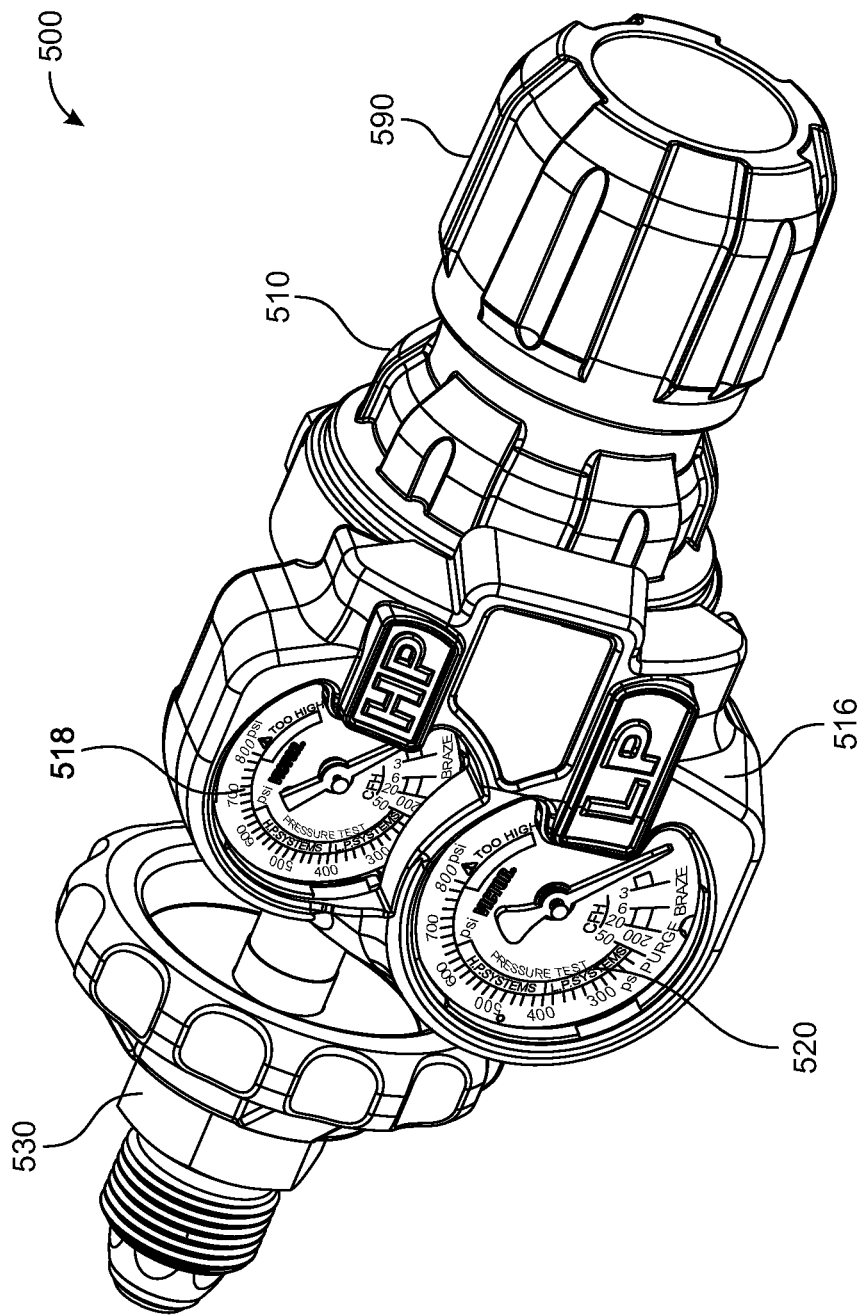
FIGS. 12 and 13 provide front and back perspective view of a hybrid pressure and flowgauge regulator including the outlet assembly of FIG. 1, according to an example embodiment of the present disclosure.
Figure 13:
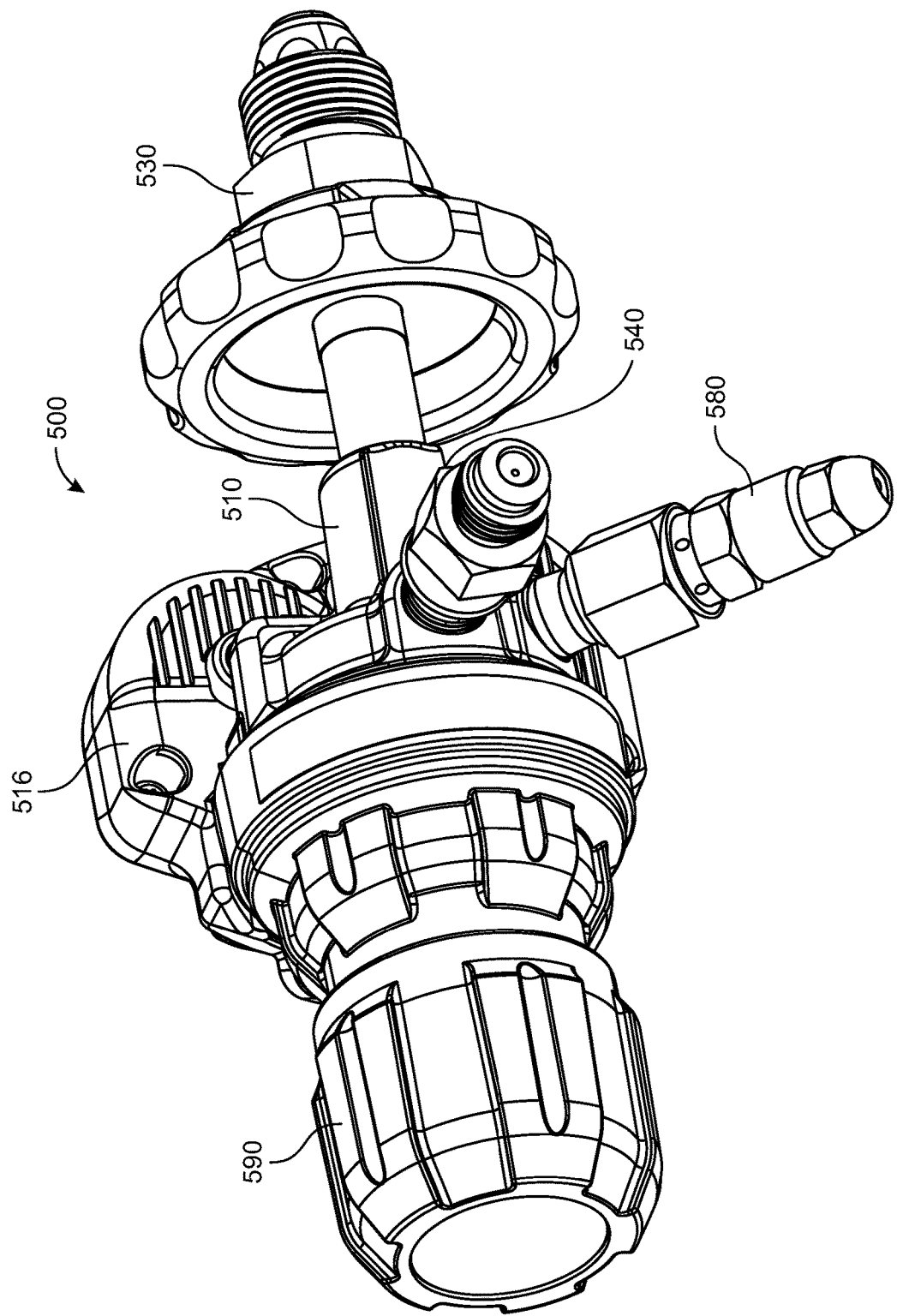

FIGS. 12 and 13 illustrate a stand-alone regulator, in which the outlet assembly presented herein may be incorporated, according to an example embodiment of the present disclosure. FIG. 12 is a front perspective view and FIG. 13 is a rear perspective view of this hybrid pressure and flowgauge regulator. Generally, in the embodiment depicted in these Figures, the regulator 500 includes a regulator body 510, an inlet 530, an outlet assembly 100 (which is representative of the outlet assembly discussed in connection with FIGS. 1-7), and an adjustment mechanism 590. However, it is to be understood that the depicted inlet 530, regulator body 510, and adjustment mechanism 590 are merely examples and, in other embodiments, the outlet assembly 100 may be installed onto any regulator body 510, with any inlet 530 or adjustment mechanism 590 in order to provide a hybrid pressure and flowgauge regulator.

In FIGS. 12 and 13, the outlet assembly 100 is 90 degrees offset from the inlet 530 (i.e., a central axis of the inlet 530 is perpendicular to a central axis of the outlet assembly 100); however, this is merely an example and, in other embodiments, the outlet assembly 100 may be oriented in any position with respect to the inlet 530. For example, the outlet assembly 100 and inlet 530 may be aligned on the same central axis or include parallel central axes. Regardless of the orientation or arrangement of the inlet 530 and outlet assembly 100, generally, the regulator body 510 includes one or more pathways that allow high-pressure gas received from the inlet 530 to flow to the outlet assembly 100. The regulator body 510 may throttle the high-pressure gas as it passes therethrough and the throttling may be controlled by the adjustment mechanism 590 (e.g., in a like manner to the throttling described above in connection with fitting 300). In the depicted embodiment, the regulator also includes a safety valve 580 (see FIG. 13) that is configured to relieve pressure in the regulator body 510 when absolutely necessary (e.g., to prevent catastrophic failure); however, other embodiments need not include a safety valve 580.

The regulator body 510 also includes a gauge housing 516 configured to support one or more gauges. In the particular embodiment shown in FIGS. 12 and 13, the gauge housing 516 supports two gauges: an inlet gauge 518 and a hybrid outlet gauge 520 (described below in connection with FIG. 14). The inlet gauge 518 is generally configured to measure the pressure of high-pressure gas flowing into the regulator body 510 via the inlet 530. Meanwhile, the hybrid outlet gauge 520 is mated to the outlet assembly to indicate flow and pressure. That is, gauge 520 provides visual feedback (e.g., an indication) of the characteristics (i.e., pressure and/or flow rate) of gas flowing through the outlet assembly 100 presented herein (i.e., gas flowing into a downstream gas line to which the regulator is connected).

Figure 14:
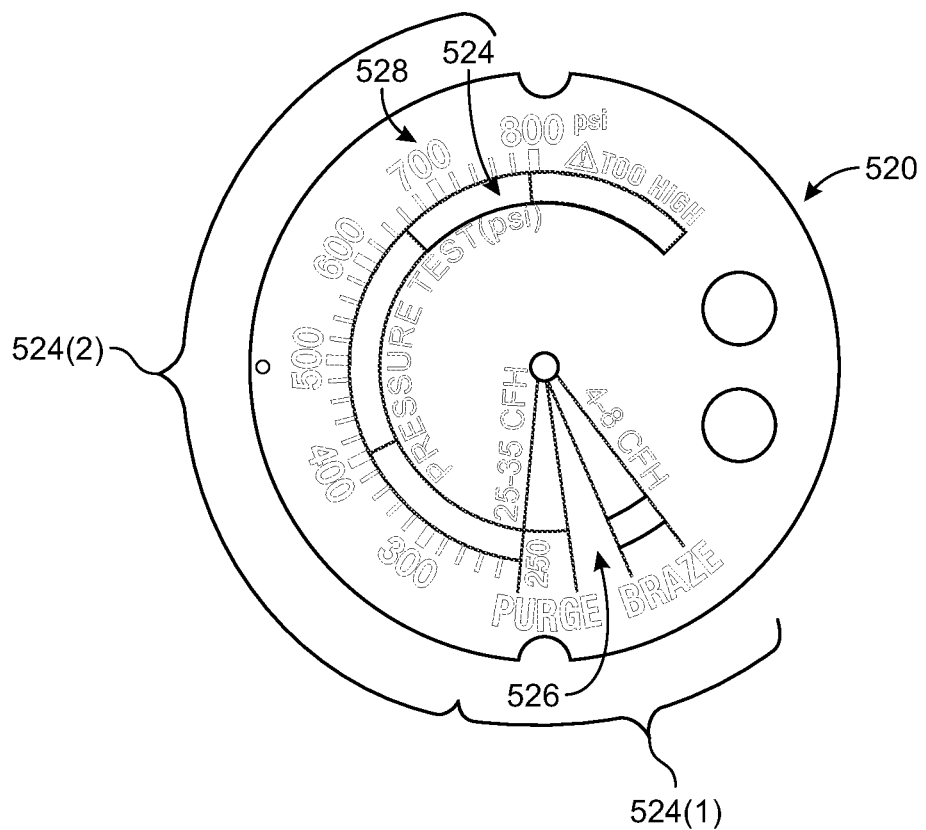
FIG. 14 is a front view of a gauge that may be used with the outlet assembly presented herein.

FIG. 14 illustrates a front view of the hybrid gauge 520. The hybrid outlet gauge 520 includes first indicia 526 and second indicia 528. The first indicia 526 provide an indication of the flow rate of gas exiting the outlet assembly presented herein. The second indicia 528 provide an indication of the pressure of gas exiting the outlet assembly presented herein. The first indicia 526 (also referred to as flow rate indicia 526) and the second indicia 528 (also referred to as pressure indicia 528) are both included in sections of a radial area 524 extending around an outer portion of the gauge 520. In particular, the flow rate indicia 526 is included in a first portion or zone 524(1) of a radial band and the pressure indicia 528 is included in a second portion or zone 524(2) of the radial band. Consequently, an indicator needle rotatably mounted in the gauge may rotate through the flow rate indicia 526 before moving into the pressure indicia 528.

Advantageously, the aforementioned features of the hybrid flow gauge 520 allow the gauge 520 to provide an indication of flow rates at low pressures and to provide an indication of pressure when the flow rate is unlikely to be of consequence. Since, as is described above, the outlet assembly presented herein automatically aligns different orifices/passageways/pathways with gas flowing therethrough based on backpressure forces exerted by the gas, the flow rate is controlled at relatively low pressures. Typically, pressure or leak tests are not performed at these pressures and, thus, providing the flow rate indicia 526 in a first or lower zone 524(1) of the radial area 524 provides an indication of the flow rate before the pressure reaches a gauge threshold pressure (which is different from the pressure thresholds that actuate the internal mechanism of the outlet assembly). Then, once the pressure is above the gauge threshold pressure (such as approximately 200 or 250 PSI), the gauge 520 may provide an indication of outlet gas pressure. At these pressures, the gas is flowing through the larger orifices/passageways/pathways of the outlet assembly to create a specific pressure and the flow rate is likely not of consequence.

Figure 15:
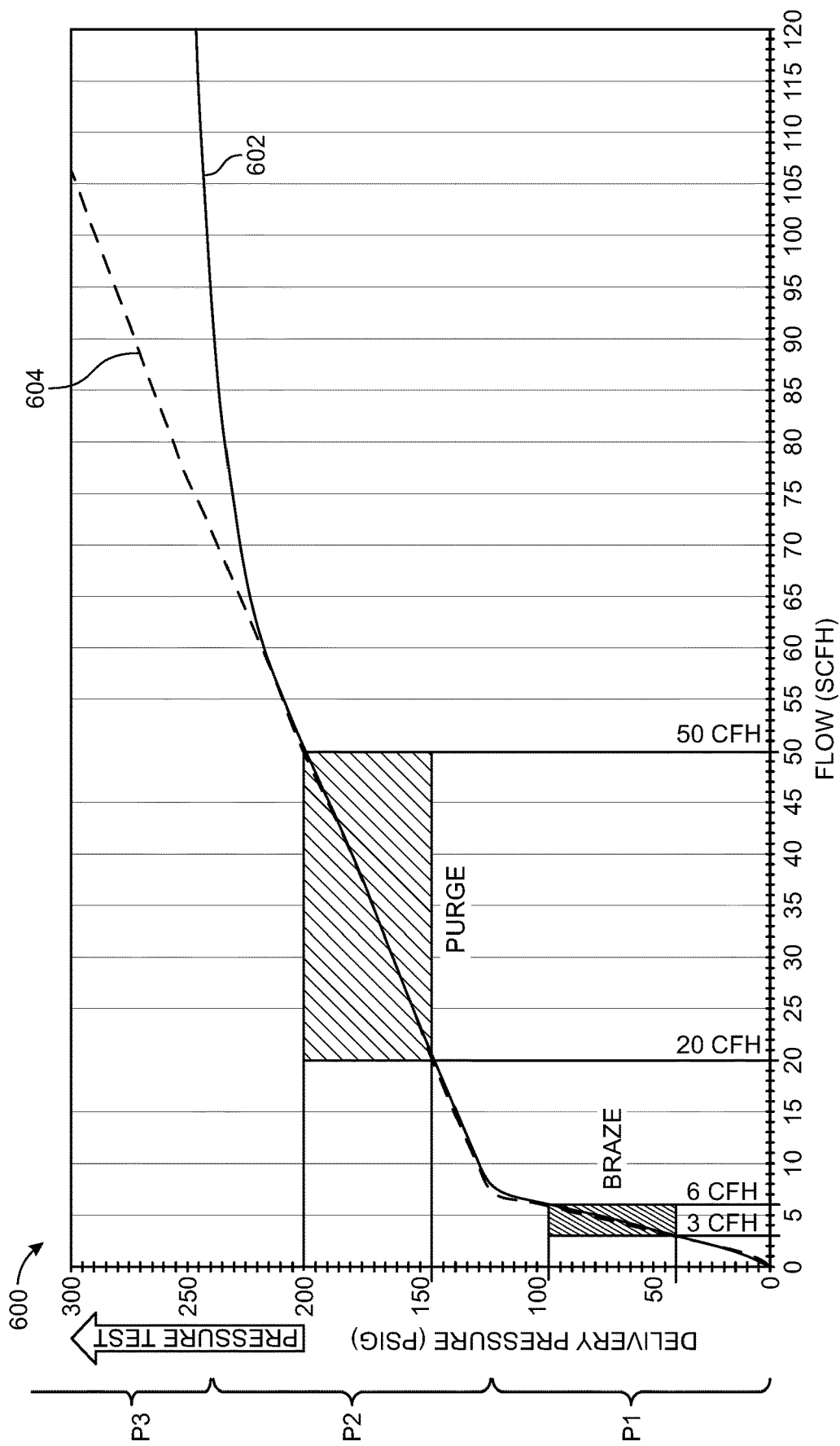
FIG. 15 is a graph illustrating pressure and flow rates provided by the outlet assembly presented herein.

Now turning to FIG. 15, with the outlet assembly design presented herein, pressure tests will operate with enhanced flow rates (e.g., 50 CFH or higher) and will not be restricted to flow purge flow rates or flow rates close to purge flow rates. Thus, pressure testing will be quick and efficient. FIG. 15 provides a graph 600 that illustrates how the flow rates of the outlet assembly presented herein (line 604) increase drastically during pressure testing. By comparison, an outlet assembly with a two-stage (e.g., single actuation) internal mechanism provides lower flow rates for equivalent pressures, as shown by line 602. Most notably, after the purge stage illustrated by the box labeled "purge," which is generally representative of the second stage S2 of the outlet assembly presented herein, line 602 tapers off to pressures within 50 psig of the purge pressure while line 604 continues to rise, nearly linearly, quickly rising to 300 psig. This graph is also a snippet and these trends continue at higher flows and pressures.

Now turning to FIG. 15, with the outlet assembly design presented herein, pressure tests will operate with enhanced flow rates (e.g., 50 CFH or higher) and will not be restricted to flow purge flow rates or flow rates close to purge flow rates. Thus, pressure testing will be quick and efficient. FIG. 15 provides a graph 600 that illustrates how the flow rates of the outlet assembly presented herein (line 602) increase drastically during pressure testing. By comparison, an outlet assembly with a two-stage (e.g., single actuation) internal mechanism provides lower flow rates for equivalent pressures, as shown by line 602. Most notably, after the purge stage illustrated by the box labeled "purge," which is generally representative of the second stage S2 of the outlet assembly presented herein, line 602 tapers off to pressures within 50 psig of the purge pressure while line 604 continues to rise, nearly linearly, quickly rising to 300 psig. This graph is also a snippet and these trends continue at higher flows and pressures.

In view of the foregoing, the hybrid regulator described and presented herein (which is effectuated by the specific outlet assembly and hybrid gauge presented herein) has a number of advantages. First, since the outlet assembly presented herein can provide higher pressure gas (e.g., over 200 psig) at high flow rates (which increase exponentially with respect to increases pressure, instead of linearly), the outlet assembly presented herein may provide significant productivity benefits for higher pressure gas uses. For example, pressure testing may be completed faster and more efficiently because the third stage allows for high pressure gas to flow through the outlet assembly at high flow rates.

Second, more generally, a hybrid regulator including the outlet assembly presented herein may increase the efficiency of plumbing and/or HVAC work, which frequently requires an operator to switch between applications requiring specific flow rates (i.e., purging and brazing operations) and operations requiring specific pressure (i.e., leak or pressure tests). That is, with the hybrid regulator described and presented herein, a user can seamlessly switch between pressure and flow applications because the regulator need not be removed and replaced with a different regulator. In fact, a user can even use the hybrid regulator described and presented herein when conducting pressure-specific operations over a range of pressures or flow rate-specific operations over a range of flow rates. Put simply, the hybrid regulator described and presented herein is fully versatile and fully adjustable to provide a range of pressures and a range of flow rates (i.e., the regulator can output a specific flow rate over a range of flow ranges and/or a specific pressure over a wide range of pressures).

Third, a hybrid regulator including the outlet assembly described and presented herein may provide a safer regulator, especially as compared to a regulator that uses different orifices to adjust the flow rate of gas at a predefined pressure. That is, since the hybrid regulator presented herein adjusts flow rates at low pressure, it eliminates the hazards associated with high-pressure flow adjustments. In particular, since the hybrid regulator presented herein controls flow rates at pressures less than or equal to pressures for which typical low-pressure industrial hoses and equipment are graded (e.g., under approximately 200 or 250 PSI), dead-ending the system is less likely to cause catastrophic hose or equipment failures. That is, if a system including low-pressure hoses and the hybrid regulator presented herein dead-ends, the low pressure hoses (or other such equipment) are less likely to fail.

Fourth, the hybrid gauge of the hybrid regulator described and presented herein provides visual feedback of the current pressure and/or flow rate on a single gauge face. This may provide the user with a level of confidence when performing operations that require a specific flow rate or a specific pressure and, together with the outlet assembly, may allow a user to adjust the characteristics of the gas flowing through the regulator to achieve, with certainty, a specific flow within a range of flow rates or a specific pressure within a range of pressures as needed.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

Additionally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

I claim:

1. An outlet assembly, comprising:
   a housing defining an internal cavity;
   a first orifice of a first size that is disposed proximate an upstream end of a main pathway that extends longitudinally through the internal cavity;
   a second orifice of a second size that is larger than the first size disposed proximate a downstream end of the main pathway;
   one or more first auxiliary pathways that are disposed between the first orifice and the second orifice and that intersect the main pathway;
   one or more second auxiliary pathways that are disposed between the first orifice and the second orifice and that intersect the main pathway, wherein the one or more second auxiliary pathways are downstream from the one or more first auxiliary pathways; and
   an internal mechanism that automatically moves the first orifice between a first position, a second position, and a third position, wherein the internal mechanism includes a movable poppet and the one or more second auxiliary pathways extend through the movable poppet, and wherein:
      when the first orifice is in the first position, a flow of gas flowing through the outlet assembly flows into the main pathway via the first orifice so that the flow of gas flows through the second orifice at a first flow rate regulated by the first orifice;
      when the first orifice is in the second position, the flow of gas primarily bypasses the first orifice and flows into the main pathway via the one or more first auxiliary pathways so that the flow of gas flows through the second orifice at a second flow rate regulated by the first orifice and the one or more first auxiliary pathways; and
      when the first orifice is in the third position, the flow of gas primarily bypasses the first orifice and flows into the main pathway via the one or more first auxiliary pathways and the one or more second auxiliary pathways so that the flow of gas flows through the second orifice at a maximum flow rate.

2. The outlet assembly of claim 1, wherein
   the movable poppet moves the first orifice between the first position, the second position, and the third position.

3. The outlet assembly of claim 2, wherein the housing defines the second orifice and the movable poppet defines the first orifice and the main pathway.

4. The outlet assembly of claim 2, wherein the internal mechanism comprises:
   a first biasing member that is biased against the movable poppet to cause the movable poppet to retain the first orifice in the first position until backpressure in the outlet assembly reaches a first predetermined threshold;
   a bypass poppet disposed around the movable poppet so that the movable poppet acts on the bypass poppet when the first orifice is in the second position; and a second biasing member that is biased against the bypass poppet to cause the bypass poppet and the movable poppet to retain the first orifice in the second position until the backpressure in the outlet assembly reaches a second predetermined threshold.

5. The outlet assembly of claim 4, wherein the backpressure automatically moves the movable poppet so that the movable poppet moves the first orifice into the second position when the backpressure reaches the first predetermined threshold and so that the movable poppet moves the first orifice into the third position when the backpressure reaches the second predetermined threshold.

6. The outlet assembly of claim 4, further comprising:
a first annular passageway that is opened when the movable poppet moves the first orifice into the second position to allow the flow of gas to primarily bypass the first orifice, the first annular passageway providing a flow path to the one or more first auxiliary pathways; and
a second annular passageway that is opened when the movable poppet moves the bypass poppet, the second annular passageway providing a flow path to the one or more second auxiliary pathways.

7. The outlet assembly of claim 1, wherein the first orifice defines an upstream entrance for the main pathway.

8. The outlet assembly of claim 1, further comprising:
a first annular flange disposed radially exteriorly of the first orifice, proximate the upstream end of the main pathway, the first annular flange being configured to seal peripheral edges of a first backpressure chamber formed around the first orifice when the first orifice is in the first position and being configured to open the peripheral edges of the first backpressure chamber when the first orifice is in the second position; and
a second annular flange disposed radially exteriorly of the first annular flange, proximate the upstream end of the main pathway, the second annular flange being configured to seal peripheral edges of a second backpressure chamber formed around the first orifice when the first orifice is in the second position and being configured to open the peripheral edges of the second backpressure chamber when the first orifice is in the third position.

9. An apparatus, comprising:
a cylinder; and
a cylinder fitting comprising the outlet assembly of claim 1.

10. The apparatus of claim 9, wherein the cylinder fitting further comprises:
a gauge that provides a visual indication of both a flow rate and a pressure of the flow of gas exiting the outlet assembly.

11. The apparatus of claim 9, wherein the cylinder fitting includes an adjustment assembly configured to control a pressure of the flow of gas prior to the flow of gas entering the outlet assembly.

12. The apparatus of claim 9, wherein the cylinder fitting is irremovably coupled to the cylinder.

13. The apparatus of claim 12, wherein the cylinder is a refillable cylinder.

14. A gas cylinder comprising:
a cylinder with a tank and an outlet; and
a hybrid pressure and flow fitting irremovably coupled to the outlet of the cylinder, the hybrid pressure and flow fitting including an outlet assembly comprising:
a housing defining an internal cavity extending from an upstream end to a downstream end;
a plug disposed within the internal cavity proximate the upstream end; and
a two-stage poppet disposed within the internal cavity between the plug and the downstream end of the internal cavity, the two-stage poppet including:
a first seat defining a central orifice;
a second seat disposed around the first seat;
a first biasing member that is biased against the first seat to cause the first seat to engage the plug until backpressure acting against the first seat reaches a first predetermined threshold, wherein disengaging the first seat from the plug opens a first flow path between the first seat and the second seat, the first flow path allowing gas to flow at a first flow rate that is greater than a flow rate allowed by the central orifice; and
a second biasing member that is biased against the second seat to cause the second seat to engage the plug until backpressure acting against the second seat reaches a second predetermined threshold, wherein disengaging the second seat from the plug opens a second flow path between the second seat and the housing, the second flow path allowing a gas to flow at a second flow rate that is greater than the flow rate allowed by the central orifice.

15. The gas cylinder of claim 14, wherein the backpressure acting against the second seat primarily acts against the second seat indirectly, by way of the first seat.

16. The gas cylinder of claim 14, wherein the second seat disengages from the plug after the first seat disengages from the plug so that the second flow path is open when the first flow path is also open.

17. The gas cylinder of claim 16, wherein, collectively, the second flow path and the first flow path allow gas to flow at a third flow rate that is greater than both the first flow rate and the flow rate allowed by the central orifice.

18. The gas cylinder of claim 16, wherein the cylinder is a refillable cylinder.

19. The gas cylinder of claim 16, wherein the hybrid pressure and flow fitting further comprises:
a pressure control;
an on/off control; and
a gauge.

20. The gas cylinder of claim 19, wherein the pressure control is aligned on a longitudinal axis of the tank of the gas cylinder and the on/off control and the gauge are oriented orthogonally to the longitudinal axis of the tank.

* * * * *